(12) United States Patent
Kobayashi et al.

(10) Patent No.: US 11,939,465 B2
(45) Date of Patent: Mar. 26, 2024

(54) PREPREG AND PRODUCTION METHOD THEREFOR, SLIT TAPE PREPREG, CARBON FIBER-REINFORCED COMPOSITE MATERIAL

(71) Applicant: Toray Industries, Inc., Tokyo (JP)

(72) Inventors: Hiroshi Kobayashi, Ehime (JP); Taiki Maeyama, Ehime (JP); Daisuke Kido, Ehime (JP); Takashi Ikushima, Otsu (JP); Naofumi Hosokawa, Nagoya (JP); Hirokazu Ohnishi, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 463 days.

(21) Appl. No.: 17/253,205

(22) PCT Filed: Mar. 27, 2019

(86) PCT No.: PCT/JP2019/013096
§ 371 (c)(1),
(2) Date: Dec. 17, 2020

(87) PCT Pub. No.: WO2020/003662
PCT Pub. Date: Jan. 2, 2020

(65) Prior Publication Data
US 2021/0363316 A1 Nov. 25, 2021

(30) Foreign Application Priority Data
Jun. 26, 2018 (JP) ................ 2018-120566

(51) Int. Cl.
*C08L 63/00* (2006.01)
*C08J 5/24* (2006.01)

(52) U.S. Cl.
CPC ............ *C08L 63/00* (2013.01); *C08J 5/243* (2021.05); *C08J 2363/02* (2013.01); *C08J 2477/00* (2013.01); *C08J 2481/06* (2013.01); *C08L 2205/03* (2013.01)

(58) Field of Classification Search
CPC ....... C08L 63/00; C08L 2205/03; C08J 5/243; C08J 2363/02; C08J 2477/00; C08J 2481/06
USPC ........................................................ 523/222
See application file for complete search history.

(56) References Cited

U.S. PATENT DOCUMENTS

| | | | |
|---|---|---|---|
| 7,611,601 B2 | 11/2009 | Nelson et al. | |
| 2013/0122277 A1 | 5/2013 | Ellis et al. | |
| 2014/0057515 A1 | 2/2014 | Suzuki et al. | |
| 2014/0087178 A1 | 3/2014 | Arai et al. | |
| 2014/0135443 A1 | 5/2014 | Aerts et al. | |
| 2017/0306117 A1* | 10/2017 | Fuse | C08J 5/243 |
| 2017/0342225 A1 | 11/2017 | Nagano et al. | |
| 2018/0291165 A1 | 10/2018 | Okamoto et al. | |
| 2019/0031847 A1 | 1/2019 | Misumi et al. | |
| 2019/0330433 A1 | 10/2019 | Kobayashi et al. | |
| 2020/0299476 A1 | 9/2020 | Aizawa et al. | |

FOREIGN PATENT DOCUMENTS

| | | | | |
|---|---|---|---|---|
| JP | 01104624 A | 4/1989 | | |
| JP | 2006291095 A | 10/2006 | | |
| JP | 2008517810 A | 5/2008 | | |
| JP | 2010229211 A | 10/2010 | | |
| JP | 2013538264 A | 10/2013 | | |
| JP | 2014524940 A | 9/2014 | | |
| JP | 2015535037 A | 12/2015 | | |
| JP | 2016155915 A | 9/2016 | | |
| JP | 2017510683 A | 4/2017 | | |
| WO | 2012133033 A1 | 10/2012 | | |
| WO | WO-2016067736 A1 * | 5/2016 | ........... | C08G 59/245 |
| WO | 2016136052 A1 | 9/2016 | | |
| WO | 2017104823 A1 | 6/2017 | | |
| WO | 2017130659 A1 | 8/2017 | | |
| WO | 2018135594 A1 | 7/2018 | | |
| WO | 2019098243 A1 | 5/2019 | | |

OTHER PUBLICATIONS

International Search Report and Written Opinion for International Application No. PCT/JP2019/013096, dated Jul. 2, 2019, 7 pages.

* cited by examiner

*Primary Examiner* — David T Karst
(74) *Attorney, Agent, or Firm* — BUCHANAN INGERSOLL & ROONEY PC

(57) ABSTRACT

A prepreg having high processability and laminating performance and a method to produce such a prepreg is described, the prepreg comprising at least the components [A] to [E] shown below, and having a structure incorporating a first layer composed mainly of the component [A] and a first epoxy resin composition that contains the components [B] to [D] but which is substantially free of the component [E], and a second layer composed mainly of a second epoxy resin composition that contains the components [B] to [E],

[A] carbon fiber,

[B] epoxy resin,

[C] curing agent,

[D] thermoplastic resin, and

[E] particles containing a thermoplastic resin as primary component and having a volume-average particle diameter of 5 to 50 μm.

9 Claims, No Drawings

PREPREG AND PRODUCTION METHOD THEREFOR, SLIT TAPE PREPREG, CARBON FIBER-REINFORCED COMPOSITE MATERIAL

CROSS REFERENCE TO RELATED APPLICATIONS

This is the U.S. National Phase application of PCT/JP2019/013096, filed Mar. 27, 2019, which claims priority to Japanese Patent Application No. 2018-120566, filed Jun. 26, 2018, the disclosures of these applications being incorporated herein by reference in their entireties for all purposes.

FIELD OF THE INVENTION

The present invention relates to a prepreg showing high processability and laminating performance in an automated lay-up device and a production method therefor.

BACKGROUND OF THE INVENTION

Fiber reinforced composite materials containing a reinforcing fiber such as glass fiber, carbon fiber, and aramid fiber combined with a matrix resin are lighter in weight compared with competing metallic materials or the like, and at the same time excellent in mechanical property such as strength and elastic modulus, and accordingly, they are currently used in many fields such as aircraft parts, spacecraft parts, automobile parts, marine parts, civil engineering and construction materials, and sporting goods. In particular, carbon fibers, which have high specific strength and specific elastic modulus are widely used, as reinforcing fibers in application fields where high mechanical property is required. In addition, thermosetting resins such as unsaturated polyester resin, vinyl ester resin, epoxy resin, phenol resin, cyanate ester resin, and bismaleimide resin are often used as matrix resins, of which epoxy resins are in wide use because of their high adhesiveness to carbon fibers.

For applications that require high performance, fiber reinforced composite materials containing continuous fibers are used, and in particular, they are generally manufactured by methods that use prepreg, i.e. sheet-like intermediate material consisting mainly of reinforcing fibers impregnated with an uncured thermosetting resin composition. In such methods, prepreg plies are laid up and cured by heating to provide a molded product of a fiber reinforced composite material. Fiber reinforced composite materials manufactured in this way have been used for various general industrial applications such as tennis rackets, golf shafts, and fishing rods and, because of having high specific strength and specific stiffness, they are now attracting attention as structural materials for aircraft, which are particularly required to be light in weight.

Available methods for laying up prepreg plies include the hand lay-up method, ATL (automated tape lay-up) method and AFP (automated fiber placement) method, which use automated lay-up devices, but automated lay-up methods such as ATL method and AFP method, which use automated lay-up devices and realize higher productivity than the hand lay-up method, are adopted (see, for example, Patent document 1) when producing large composite materials such as for aircraft. In particular, the AFP method, which is designed to lay up slit tape prepregs prepared by cutting a prepreg in the fiber direction into tapes, is suitable for producing parts containing a relatively large number of curved faces such as aircraft fuselage, and realizes high-yield material production, and accordingly, this method has been frequently adopted in recent years.

In the AFP method, about ten to several tens of narrow slit tapes with widths of 3 to 13 mm are passed between guide rolls, collected on a machine head, and laid up on a laminate in order to achieve a high lamination efficiency. In this step, as the guide rolls and the slit tape prepregs abrade each other, the epoxy resin composition contained in the slit tape prepregs comes out and adheres to the guide rolls, leading to the problem of a subsequent decrease in the processability of the slit tape prepregs. In the above process, the unwinding of the slit tape prepregs and their collection on the machine head are performed under low temperature conditions, for example at 20° C. or less, where the storage elastic modulus (hereinafter referred to as G') of the epoxy resin composition becomes higher, in order to prevent the build-up of the epoxy resin composition to the guide rolls. In order to achieve sufficient adhesiveness between the tool and slit tape prepregs and between one slit tape prepreg and another during the laying-up step, the slit tape prepregs are often heated by an infrared heater or the like to raise the temperature to improve adhesion.

Patent document 2, which deals with slit tape prepregs intended for reinforcing concrete structures and steel structures, etc., proposes a production method in which one directional prepregs containing untwisted reinforcing fiber bundles are cured to a degree where the resin conversion of the matrix resin composition reaches 20% to 70% to provide semi-cured prepregs, followed by cutting them in the fiber direction of the reinforcing fibers, and describes that the resulting slit tape prepregs contain highly straight reinforcing fibers and is resistant to twisting, low in tape face stickiness (hereinafter referred to as tackiness), and high in handleability.

Patent document 3 discloses a slit tape prepreg in which an epoxy resin composition having a viscosity of $1.0 \times 10^5$ to $1.0 \times 10^9$ Pa·s at 25° C. and a glass transition temperature of 7° C. to 15° C. is located near both of the thickness-directional end surfaces of the prepreg while an epoxy resin composition having a viscosity of $5.0 \times 10^2$ to $1.0 \times 10^5$ Pa·s at 25° C. is located in the thickness-directional central portion, and it is described that the aforementioned build-up of the epoxy resin composition to guide rolls is reduced and that high drapability is achieved.

Patent document 4 discloses a slit tape prepreg having a tackiness value of 5 to 40 kPa as measured at 23° C. under a plunger pressing pressure of 90 kPa, a tackiness value of 35 to 100 kPa as measured at 45° C. under a plunger pressing pressure of 150 kPa, and a drape value of 10° to 40° at 23° C., and describes that it is so low in adhesiveness at room temperature that it can unwind easily but can be hardly caught on guide rolls or compaction rolls and that it has moderate hardness at room temperature to realize high shape retainability in the lamination head portion. It also describes that the portion heated at about 30° C. to 60° C. by the lamination head has moderate stickiness to serve suitably for an automated lay-up process. It further describes that it is preferable for the epoxy resin composition used in the slit tape prepreg disclosed in Patent document 4 to have a viscosity in the range of $1.0 \times 10^4$ to $1.0 \times 10^5$ Pa·s at 30° C.

PATENT DOCUMENTS

Patent document 1: Published Japanese Translation of PCT International Publication JP2008-517810
Patent document 2: Japanese Unexamined Patent Publication (Kokai) No. 2016-155915
Patent document 3: Japanese Unexamined Patent Publication (Kokai) No. 2010-229211
Patent document 4: International Publication WO International 2017/104823

SUMMARY OF THE INVENTION

The production method described in Patent document 2 is intended for a different purpose, and the slit tape prepreg obtained is already in such a highly cured state that it cannot undergo significant twisting. Accordingly, it lacks in drapability and fails to have sufficient steering ability on the curved surfaces of the guide rolls and therefore, it is difficult to apply the tape to an automated lay-up method.

The slit tape prepregs described in Patent documents 3 and 4 are still so high in tackiness that prepreg plies adhere easily to each other or to metal parts at room temperature, indicating that the tackiness is not sufficiently low.

In view of the above situation, an object of the present invention is to provide a prepreg having high drapability and serving to produce a slit tape prepreg that suffers only a sufficiently decreased amount of build-up of the epoxy resin composition contained in the slit tape prepreg to the guide rolls during the implementation of an automated lay-up method and shows good laminating performance over a wide lamination temperature range, thereby ensuring an increased productivity of carbon fiber reinforced composite material, and also provide a method for the production thereof.

The present inventors conducted intensive research to solve the above problem and arrived at the invention described below. Specifically, the prepreg according to the present invention is: a prepreg including at least the components [A] to [E] specified below, having a structure incorporating a first layer composed mainly of the component [A] and a first epoxy resin composition that contains the components [B] to [D] but is substantially free of the component [E] and a second layer composed mainly of a second epoxy resin composition that contains the components [B] to [E] and disposed adjacent to each surface of the first layer, the second epoxy resin composition being characterized in that its component [D] has a weight-average molecular weight of 2,000 to 30,000 g/mol and accounts for 5 to 15 parts by mass relative to the total quantity of its components [B] to [E], which accounts for 100 parts by mass, and also characterized by having a storage elastic modulus G' at 25° C. of 8.0×10$^5$ to 6.0×10$^6$ Pa as measured at an angular frequency of 3.14 rad/s, giving a value of 0.085 or more as calculated by the equation (1) given below, and showing a glass transition temperature of −10° C. or more and less than 7° C. as measured by differential scanning calorimetry (DSC), and the component [D] contained therein accounting for 1 part by mass or more and less than 10 parts by mass relative to the total quantity of the first epoxy resin composition and the second epoxy resin composition, which accounts for 100 parts by mass:

[A] carbon fiber,

[B] epoxy resin,

[C] curing agent,

[D] thermoplastic resin, and

[E] particles containing a thermoplastic resin as primary component and having a volume-average particle diameter of 5 to 50 μm.

[Mathematical formula 1]

$$\frac{\log_{10}(G'(\text{Pa}) \text{ at } 25°\text{ C.}) - \log_{10}(G'(\text{Pa}) \text{ at } 40°\text{ C.})}{15} \quad \text{equation (1)}$$

The slit tape prepreg according to the present invention is produced by slitting the aforementioned prepreg.

In addition, the carbon fiber reinforced composite material according to the present invention is produced by laying up plies of the prepreg or slit tape prepregs as described above, followed by curing them.

The production method for the prepreg according to the present invention include:

a step for preparing a primary prepreg by impregnating the component [A] given below with a first epoxy resin composition containing at least the components [B] to [D] given below, and a subsequent step for impregnating each surface thereof with a second epoxy resin composition containing at least the components [B] to [E] given below, the second epoxy resin composition being characterized in that its component [D] has a weight-average molecular weight of 2,000 to 30,000 g/mol and accounts for 5 to 15 parts by mass relative to the total quantity of its components [B] to [E], which accounts for 100 parts by mass, and also characterized by having a storage elastic modulus G' at 25° C. of 8.0×10$^5$ to 6.0×10$^6$ Pa as measured at an angular frequency of 3.14 rad/s, giving a value of 0.085 or more as calculated by the equation (1) given above, and showing a glass transition temperature of −10° C. or more and less than 7° C. as measured by differential scanning calorimetry (DSC), and the component [D] contained therein accounting for 1 part by mass or more and less than 10 parts by mass relative to the total quantity of the first epoxy resin composition and the second epoxy resin composition, which accounts for 100 parts by mass:

[A] carbon fiber,

[B] epoxy resin,

[C] curing agent,

[D] thermoplastic resin, and

[E] particles containing a thermoplastic resin as primary component and having a volume-average particle diameter of 5 to 50 μm.

The present invention can provide a prepreg having high drapability and serving to produce a slit tape prepreg that suffers only a sufficiently decreased amount of build-up of the epoxy resin composition contained in the slit tape prepreg to the guide rolls during the implementation of an automated lay-up method and shows good laminating performance over a wide lamination temperature range, thereby ensuring an increased productivity of carbon fiber reinforced composite material, and also provide a method for the production thereof.

DETAILED DESCRIPTION OF EMBODIMENTS OF THE INVENTION

The present invention will be described more in detail below.

The prepreg according to the present invention is a prepreg including at least the components [A] to [E] given below, having a structure incorporating a first layer composed mainly of the component [A] and a first epoxy resin composition that contains the components [B] to [D] but is substantially free of the component [E] and a second layer composed mainly of a second epoxy resin composition that contains the components [B] to [E] and disposed adjacent to each surface of the first layer, the second epoxy resin composition being characterized in that its component [D] has a weight-average molecular weight of 2,000 to 30,000 g/mol and accounts for 5 to 15 parts by mass relative to the total quantity of its components [B] to [E], which accounts for 100 parts by mass, and also characterized by having a storage elastic modulus G' at 25° C. of $8.0 \times 10^5$ to $6.0 \times 10^6$ Pa as measured at an angular frequency of 3.14 rad/s, giving a value of 0.085 or more as calculated by the equation (1) given above, and showing a glass transition temperature of $-10°$ C. or more and less than 7° C. as measured by differential scanning calorimetry (DSC), and the component [D] contained therein accounting for 1 part by mass or more and less than 10 parts by mass relative to the total quantity of the first epoxy resin composition and the second epoxy resin composition, which accounts for 100 parts by mass:

[A] carbon fiber,
[B] epoxy resin,
[C] curing agent,
[D] thermoplastic resin, and
[E] particles containing a thermoplastic resin as primary component and having a volume-average particle diameter of 5 to 50 μm.

Here, the component [B] contained in the first epoxy resin composition and the component [B] contained in the second epoxy resin composition may be either identical or different between the first epoxy resin composition and the second epoxy resin composition, and the same applies between the component [C] contained in the first epoxy resin composition and the component [C] contained in the second epoxy resin composition and also between the component [D] contained in the first epoxy resin composition and the component [D] contained in the second epoxy resin composition. In addition, the proportions of the components [C] and [D] contained in the first epoxy resin composition and the proportions of the components [C] and [D] contained in the second epoxy resin composition may also be either identical or different between the first epoxy resin composition and the second epoxy resin.

In the description given below, the constituents of a prepreg other than the component [A], namely, the first epoxy resin composition that contains the components [B] to [D] but is substantially free of the component [E] and/or the second epoxy resin composition that contains the components [B] to [E], are collectively referred to as matrix resins, or the components other than the component [A] in a carbon fiber reinforced composite material produced by curing a prepreg are collectively referred to as matrix resins.

As a result of adopting a structure as described above, the second epoxy resin composition contained in the second layer in the prepreg according to the present invention has a sufficiently high G' at 25° C. of $8.0 \times 10^5$ to $6.0 \times 10^6$ Pa as measured at an angular frequency 3.14 rad/s and accordingly serves to produce a slit tape prepreg that suffers only a sufficiently decreased amount of build-up of the epoxy resin composition contained in the slit tape prepreg to the guide rolls during the implementation of an automated lay-up method.

Furthermore, the second epoxy resin composition contains the components [B] to [E]. The component [D] contained has a weight-average molecular weight of 2,000 to 30,000 g/mol and accounts for 5 to 15 parts by mass relative to the total quantity of the components [B] to [E], which accounts for 100 parts by mass, and the equation (1) shown above gives a value of 0.085 or more to ensure a decrease in the aforementioned build-up of the epoxy resin composition to the guide rolls and a high adhesiveness between prepregs over a wide lamination temperature range.

In addition, the second epoxy resin composition has a glass transition temperature of $-10°$ C. or more and less than 7° C. as measured by differential scanning calorimetry (DSC) and the component [D] contained accounts for 1 part by mass or more and less than 10 parts by mass relative to the total quantity of the first and second epoxy resin compositions, which accounts for 100 parts by mass, thereby ensuring a high drapability over a wide lamination temperature range. The prepreg according to the present invention is high in both adhesiveness and drapability and accordingly shows good laminating performance over a wide lamination temperature range. As a result of the above features, the use of the prepreg according to the present invention serves to produce carbon fiber reinforced composite materials with improved productivity.

Each of the components is described in detail below.

The carbon fiber used as the component [A] for the present invention is high in specific strength and specific elastic modulus and also high in conductivity, and therefore, can be used suitably in applications where good mechanical property and high conductivity are required.

The various carbon fibers that can serve as the component [A] are classified by type of the precursor used and examples include acrylic, pitch based, and rayon based carbon fibers, of which acrylic carbon fiber is particularly preferred because it is high in tensile strength.

Acrylic carbon fiber can be produced through, for example, a process as described below.

First, a spinning solution that contains polyacrylonitrile produced from monomers formed of acrylonitrile as primary component is spun by wet spinning, dry-wet spinning, dry spinning, or melt spinning to provide a coagulated thread. Then, the coagulated thread is processed in a yarn-making step to prepare a precursor (precursory fiber). Then, the precursor is subjected to steps for stabilization, carbonization, etc., for conversion into carbon fiber, thus providing acrylic carbon fiber. Here, the primary component referred to herein is the monomer component that is the highest in mass content.

The carbon fiber of the component [A] may be in the form of twisted yarns, untwisted yarns, or non-twisted yarns. In a twisted yarn, the filaments contained in a carbon fiber bundle are not aligned in parallel and will result in a carbon fiber reinforced composite material having deteriorated mechanical property and accordingly, the use of untwisted yarns or non-twisted yarns is preferred because they serve to produce carbon fiber reinforced composite materials having moldability and strength properties in a good balance.

The carbon fiber of the component [A] preferably has a tensile modulus of 200 to 440 GPa. The tensile modulus of carbon fiber depends on the degree of crystallinity of the graphite structure present in the carbon fiber, and the elastic modulus increases with an increasing degree of crystallinity. Furthermore, the conductivity also increases with an increasing degree of crystallinity. If the carbon fiber of the component [A] has a tensile modulus in this range, it is preferred because it serves to produce carbon fiber reinforced composite materials having conductivity, stiffness, and strength all in a good balance at a high level. It is more preferable for the carbon fiber to have a tensile modulus of 230 to 400 GPa, and it is still more preferable for the carbon fiber to have a tensile modulus of 260 to 370 GPa. Here, the tensile modulus of carbon fiber is measured according to JIS R7601 (2006).

Commercial products of carbon fiber that can be used as the component [A] include Torayca® T800SC-24000, Torayca® T800HB-12000, Torayca® T700SC-24000, Torayca® T700SC-12000, Torayca® T300-12000, Torayca® T1000 GB-12000, Torayca® T1100GC-12000, and Torayca® T1100GC-24000 (all manufactured by Toray Industries, Inc.).

The component [B] used for the present invention is an epoxy resin having two or more glycidyl groups in a molecule. The use of an epoxy resin having less than two glycidyl groups in a molecule is not preferable because a cured product produced by heating and curing its mixture with a curing agent as described later will be low in glass transition temperature. Examples of the epoxy resins used for the present invention include bisphenol type epoxy resins such as bisphenol A type epoxy resin, bisphenol F type epoxy resin, bisphenol AD type epoxy resin, and bisphenol S type epoxy resin; brominated epoxy resins such as tetrabromobisphenol A diglycidyl ether; novolac type epoxy resins such as epoxy resin having a biphenyl backbone, epoxy resin having a naphthalene backbone, epoxy resin having a dicyclopentadiene backbone, phenol novolac type epoxy resin, and cresol novolac type epoxy resin; glycidyl amine type epoxy resins such as N, N,O-triglycidyl-m-aminophenol, N, N,O-triglycidyl-p-aminophenol, N, N,O-triglycidyl-4-amino-3-methyl phenol, N, N, N',N'-tetraglycidyl-4,4'-methylene dianiline, N, N, N',N'-tetraglycidyl-2,2'-diethyl-4,4'-methylene dianiline, N,N,N',N'-tetraglycidyl-m-xylylene diamine, N,N-diglycidyl aniline, and N,N-diglycidyl-o-toluidine; and others such as resorcin diglycidyl ether and triglycidyl isocyanurate. In particular, epoxy resins having three or more glycidyl groups in a molecule can form cured products having high glass transition temperature and elastic modulus and accordingly serve suitably in the aviation and aerospace industries.

Commercial products of bisphenol A type epoxy resin include jER® 825, jER® 827, jER® 828, jER® 834, jER® 1001, jER® 1004, jER® 1007 (all manufactured by Mitsubishi Chemical Corporation), EPICLON® 850 (manufactured by DIC Corporation), Epotohto® YD-128 (manufactured by Nippon Steel & Sumikin Chemical Co., Ltd.), D.E.R.® 331 and D.E.R.® 332 (both manufactured by The Dow Chemical Company).

Commercial products of bisphenol F epoxy resin include jER® 806, jER® 807, jER® 1750 (all manufactured by Mitsubishi Chemical Corporation), EPICLON® 830 (manufactured by DIC Corporation), and Epotohte YDF-170 (manufactured by Nippon Steel & Sumikin Chemical Co., Ltd.).

Commercial products of epoxy resin containing three or more glycidyl groups in a molecule include SUMI-EPDXY® ELM434 (manufactured by Sumitomo Chemical Co., Ltd.), Araldite® MY720, Araldite® MY721, Araldite® MY9512, Araldite® MY9663 (all manufactured by Huntsman Corporation), Epotohto® YH-434 (manufactured by Nippon Steel & Sumikin Chemical Co., Ltd.), SUMI-EPDXY® ELM120, SUMI-EPDXY® ELM100 (both manufactured by Sumitomo Chemical Co., Ltd.), jER® 630 (Mitsubishi Chemical Corporation), Araldite® MY0500, Araldite® MY0510, and Araldite® MY0600 (all manufactured by Huntsman Corporation).

These epoxy resins may be used singly or a plurality thereof may be used in combination. Combining an epoxy resin showing fluidity at an appropriate temperature with an epoxy resin showing no fluidity at an appropriate temperature is effective for fluidity control of the matrix resin during heat-curing of the resulting prepreg. For example, if the matrix resin is high in fluidity before start of gelation in the heat-curing step, disturbance in the alignment of reinforcing fibers may take place or the matrix resin may flow out of the system to cause the fiber mass content to go out of the predetermined range, possibly resulting in a carbon fiber reinforced composite material with deteriorated physical properties. Combining a plurality of epoxy resins showing different viscoelastic behaviors is effective for providing a prepreg having appropriate levels of tackiness property and drapability.

The epoxy resin composition according to the present invention may contain appropriately selected epoxy resin components other than the component [B], such as monoepoxy resins containing only one epoxy group in a molecule and alicyclic epoxy resins, unless they cause a significant reduction in heat resistance or mechanical properties.

The curing agent used as the component [C] for the present invention may be any compound that has an active group that can react with an epoxy resin under energy irradiation via, for example, exposure to heat, microwave, visible light, infrared light, ultraviolet light, electron beam, or radiation. Examples of such an active group that can react with an epoxy resin include those containing an amino group or an acid anhydride group. When using a curing agent for an epoxy resin, the storage stability of the prepreg that contains it is preferably as high as possible, and from the viewpoint of allowing the prepreg to have a high storage stability, it is preferably solid at 23° C. Here, the expression "being solid" means that at least either the glass transition temperature or the melting point is 23° C. or more and the substance substantially does not show fluidity at 23° C.

The component [C] is preferably an aromatic amine compound and preferably has one to four phenyl groups in the molecule from the viewpoint of heat resistance and mechanical property. Furthermore, since a molecule backbone having a bent structure can contribute to an increase in the resin's elastic modulus and improvement in mechanical property, the epoxy resin curing agent is preferably an aromatic polyamine compound in which at least one phenyl group present in the backbone has an amino group at an ortho or meta position. Furthermore, from the viewpoint of heat resistance, an aromatic polyamine compound in which two or more phenyl groups have amino groups at the para position is preferred. Specific examples of such aromatic polyamine compounds include meta-phenylene diamine, diaminodiphenylmethane, diaminodiphenyl sulfone, meta-xylylene diamine, (p-phenylene methylene) dianiline, various derivatives thereof such as alkyl-substituted derivatives, and various isomers having amino groups at different positions. To provide materials for spacecraft and aircraft, in particular, the use of 4,4'-diaminodiphenyl sulfone or 3,3'-diaminodiphenyl sulfone is preferred because they can give cured products having high heat resistance and elastic modulus while hardly suffering from a decrease in linear expansion coefficient or a reduction in heat resistance due to moisture absorption. These aromatic amine compounds may be used singly or two or more thereof may be used in combination. When mixed with other components, they may be powder or liquid, or powdery and liquid aromatic amine compounds may be mixed together.

Usable commercial products of aromatic amine compounds include SEIKACURE®-S (manufactured by Seika K.K.), MDA-220 (manufactured by Mitsui Chemicals, Inc.), LONZACURE® M-DIPA (manufactured by Lonza), LONZACURE® M-MIPA (manufactured by Lonza), and 3,3'-DAS (manufactured by Mitsui Chemicals, Inc.).

When an aromatic amine is used as the component [C], its content is preferably such that the number of moles of the active hydrogen atoms in the aromatic amine compound is 0.6 to 1.2 times, preferably 0.8 to 1.1 times, as large as the number of moles of the epoxy groups in the epoxy resin contained in the prepreg from the viewpoint of heat resistance and mechanical property. If it is less than 0.6 times, the resulting cured product will fail to have a sufficiently high crosslinking density, leading to a lack of elastic modulus and heat resistance, and the resulting carbon fiber reinforced composite material will fail to have sufficient static strength property in some cases. If it is more than 1.2 times, the resulting cured product will have an excessively high crosslinking density, which leads to a lack of plastic deformation capacity, and the resulting carbon fiber composite material will possibly fail to have sufficient impact resistance.

In addition to the component [C] in the prepreg according to the present invention, a curing accelerator or a polymerization initiator that is activated by visible light or ultraviolet light may be added unless they impair the heat resistance or heat stability of the epoxy resin composition. Examples of such a curing accelerator include tertiary amine, Lewis complex, onium salt, imidazole compound, urea compound, hydrazide compound, and sulfonium salt. The contents of the curing accelerator and polymerization initiator have to be adjusted appropriately according to the types used, but they are preferably 10 parts by mass or less, preferably 5 parts by mass or less, relative to the total quantity, which accounts for 100 parts by mass, of the epoxy resin. The content of the curing accelerator controlled in this range is preferred because an uneven temperature distribution will not occur easily during the molding of a carbon fiber reinforced composite material in the case where the contents of the curing accelerator and polymerization initiator contained are in the above range.

It is preferable that the thermoplastic resin used as the component [D] is soluble in the epoxy resin used as the component [B]. Furthermore, the incorporation of the component [D] is expected to work effectively in improving the adhesiveness between the matrix resin and the carbon fiber and accordingly, it is preferable that a thermoplastic resin containing a functional group having hydrogen bond property is used as the component [D]. Examples of such a functional group having hydrogen bond property include alcoholic hydroxyl groups, amide bonds, sulfonyl groups, carbonyl groups, and carboxyl groups.

The expression "being soluble in an epoxy resin" as used herein means that there exists a temperature region where a homogeneous phase is formed as a result of mixing the thermoplastic resin [D] with an epoxy resin and subsequently heating and stirring them. Here, the expression "forming a homogeneous phase" means that there is a state where phase separation is not found by visual observation. As long as a homogeneous phase can be formed in a particular temperature range, separation may occur in other temperature ranges. For example, if the thermoplastic resin [D] is dissolvable in an epoxy resin when heated, it can be regarded as "being soluble in the epoxy resin" even if separation occurs when cooled to 23° C. Dissolution may be confirmed by the following method. Specifically, powder of the thermoplastic resin [D] is mixed with an epoxy resin and maintained for several hours, for example 2 hours, at a constant temperature that is lower than the glass transition temperature of the thermoplastic resin [D] while measuring the viscosity change, and it can be decided that the thermoplastic resin [D] is soluble in the epoxy resin if the measured viscosity is larger by 5% or more than the viscosity of the epoxy resin alone heated at the same constant temperature.

Examples of thermoplastic resin having an alcoholic hydroxyl group include polyvinyl acetal resins such as polyvinyl formal and polyvinyl butyral as well as polyvinyl alcohol and phenoxy resin.

Examples of thermoplastic resin having an amide bond include polyamide, polyimide, polyamideimide, and polyvinyl pyrolidone.

Examples of thermoplastic resin having a sulfonyl group include polysulfone and polyethersulfone.

Examples of thermoplastic resin having a carbonyl group include aromatic polyetherketones such as polyetheretherketone.

Examples of thermoplastic resin having a carboxyl group include polyester, polyamide, and polyamideimide. The carboxyl group may be located in the main chain and/or at a chain end.

Of the above ones, polyamides, polyimides, and polysulfones may contain, in their principal chains, an ether bond or a functional group such as carbonyl group. In the polyamide compounds, the nitrogen atom in the amide group may have a substituent.

Commercially available products of thermoplastic resin that is soluble in epoxy resins and at the same time has a functional group having hydrogen bond property include polyvinyl acetal resin products such as Mowital® (manufactured by Kuraray Co., Ltd.) and Vinylec® K (manufactured by JNC); polyvinyl alcohol resin products such as Denka Poval® (manufactured by Denka Company Limited); polyamide resin products such as Macromelt® (manufactured by Henkel) and Amilan® CM4000 (manufactured by Toray Industries, Inc.); polyimide products such as Ultem® (manufactured by SABIC), Aurum® (manufactured by Mitsui Chemicals, Inc.), and Vespel® (manufactured by Du Pont); polyetheretherketone polymer products such as Victrex® (manufactured by Victrex); polysulfone products such as UDEL® (manufactured by Solvay); and polyvinyl pyrrolidone products such as Luviskol® (manufactured by BASF).

Other preferred examples of such a thermoplastic resin soluble in epoxy resins include those thermoplastic resins having polyaryl ether backbones. The use of such a thermoplastic resin having a polyaryl ether backbone as the component [D] serves to control the tackiness of the resulting prepreg, control the fluidity of the matrix resin during heat-curing of the prepreg, and provide a tough carbon fiber reinforced composite material without impairing the heat resistance or elastic modulus.

Examples of thermoplastic resin having a polyaryl ether backbone include polysulfone, polyphenyl sulfone, polyethersulfone, polyetherimide, polyphenylene ether, polyetheretherketone, and polyether ether sulfone, and these thermoplastic resins having polyaryl ether backbones may be used singly or as a combination of two or more thereof.

To ensure a high heat resistance, in particular, the thermoplastic resin having a polyaryl ether backbone preferably has a glass transition temperature (Tg) of at least 150° C. or more, more preferably 170° C. or more. If the glass transition temperature of the thermoplastic resin having a polyaryl ether backbone is less than 150° C., moldings produced therefrom may liable to thermal deformation in some cases.

The terminal functional group in the thermoplastic resin having a polyaryl ether backbone is preferably a hydroxyl group, carboxyl group, thiol group, anhydride, etc. because they can react with a cation-polymerizable compound.

Commercial products of thermoplastic resin having a polyaryl ether backbone and also having such a terminal functional group include commercial products of polyethersulfone such as Sumika Excel® PES3600P, Sumika Excel® PES5003P, Sumika Excel® PES5200P, and Sumika Excel® PES7200P (all manufactured by Sumitomo Chemical Co., Ltd.); and Virantage® VW-10200RFP, Virantage® VW-10300FP, and Virantage® VW-10700RFP (all manufactured by Solvay); and also include copolymer oligomers of polyethersulfone and polyether ether sulfone as described in Published Japanese Translation of PCT International Publication JP 2004-506789; and commercial products of polyetherimide such as Ultem® 1000, Ultem® 1010, and Ultem® 1040 (all manufactured by SABIC). An oligomer as referred to herein is a polymer composed of a finite number, commonly 10 to 100, of monomers bonded to each other.

In particular, the use of polysulfone or polyethersulfone is preferred from the viewpoint of the solubility in epoxy resins, heat resistance, solvent resistance, and toughness improvement.

In the second epoxy resin composition contained in the second layer of the prepreg according to the present invention, it is essential for the component [D] contained to have a weight-average molecular weight in the range of 2,000 to 30,000 g/mol and account for 5 to 15 parts by mass relative to the total quantity of the components [B] to [E], which accounts for 100 parts by mass. It is preferable for the component [D] in the second epoxy resin composition to have a weight-average molecular weight in the range of 10,000 to 27,000 g/mol, more preferably in the range of 15,000 to 25,000 g/mol, and still more preferably in the range of 17,000 to 23,000 g/mol.

The weight-average molecular weight referred to herein means the weight-average molecular weight measured by gel permeation chromatography and converted in terms of polystyrene. If the weight-average molecular weight is less than 2,000 g/mol, it may lead to a carbon fiber reinforced composite material that lacks in mode-I interlayer toughness. Furthermore, if it is more than 30,000 g/mol, the value defined by the above equation (1) is likely to decrease, making it difficult to realize both high processability and good laminating performance simultaneously in an automated lay-up device.

It is preferable that the component [D], which has a weight-average molecular weight in the range of 2,000 to 30,000 g/mol, accounts for 7 to 13 parts, more preferably 8 to 12 parts by mass, and still more preferably 9 to 11 parts by mass, relative to the total quantity of the components [B] to [E], which accounts for 100 parts by mass. If it is less than 5 parts by mass, the resulting carbon fiber reinforced composite material will be poor in mode-I interlayer toughness in some cases. On the other hand, if it is more than 15 parts by mass, the value defined by the above equation (1) will decrease in some cases, making it difficult to realize both high processability and good laminating performance simultaneously in an automated lay-up device.

As described above, by adjusting the weight-average molecular weight and the content of the component [D] in the ranges specified above, it becomes possible to obtain a prepreg serving to produce a slit tape prepreg that suffers only a sufficiently decreased amount of build-up of the epoxy resin composition contained in the slit tape prepreg to the guide rolls during the implementation of an automated lay-up method, and shows good laminating performance over a wide lamination temperature range.

It should be noted here that the second epoxy resin composition may contain a component [D] having a weight-average molecular weight that is outside the range of 2,000 to 30,000 g/mol unless it impairs the advantageous effects of the present invention.

There are no specific limitations on the weight-average molecular weight of the component [D] in the first epoxy resin composition, but it is preferably in the range of 2,000 to 60,000 g/mol, more preferably 10,000 to 55,000 g/mol, still more preferably 15,000 to 50,000 g/mol, and particularly preferably 15,000 to 30,000 g/mol. If the weight-average molecular weight is less than 2,000 g/mol, it may lead to a carbon fiber reinforced composite material that lacks in tensile strength. If it is more than 60,000 g/mol, on the other hand, the epoxy resin composition will be high in viscosity and difficult to knead when a thermoplastic resin is dissolved in the epoxy resin composition, possibly leading to difficulty in prepreg production.

It is essential for the component [D] in the first and the second epoxy resin composition to account for 1 part by mass or more and less than 10 parts by mass, preferably 2 parts by mass or more and less than 9 parts by mass, more preferably 4 parts by mass or more and less than 8 parts by mass, still more preferably 6 parts by mass or more and less than 7 parts by mass, relative to the total quantity of the first and the second epoxy resin composition, which represents 100 parts by mass. If it is less than 1 part by mass, the resulting carbon fiber reinforced composite material will be insufficient in tensile strength in some cases. On the other hand, if it exceeds 10 parts by mass, the resulting prepreg will be insufficient in drapability in some cases.

As described above, by adjusting the weight-average molecular weight and the content of the component [D] in the ranges specified above, it becomes possible to obtain a prepreg having high drapability and serving to produce a slit tape prepreg that suffers only a sufficiently decreased amount of build-up of the epoxy resin composition contained in the slit tape prepreg to the guide rolls during the implementation of an automated lay-up method, and shows good laminating performance over a wide lamination temperature range.

When present in the second epoxy resin composition that is contained in the second layer of the prepreg according to the present invention, the particles that incorporate, as primary component, the thermoplastic resin used as the component [E] for the present invention can work to improve the G' of the second epoxy resin composition without decreasing the value defined by the equation (1). In addition, the prepreg according to the present invention can be cured into a carbon fiber reinforced composite material having a high impact resistance.

It is noted that such particles that incorporate, as primary component, a thermoplastic resin as referred to herein mean those particles in which the thermoplastic resin accounts for the largest proportion by mass and may be thermoplastic resin particles formed only of a thermoplastic resin.

Examples of the thermoplastic resin that can be used in the particles that incorporate, as primary component, the thermoplastic resin used as the component [E] for the present invention include the same various thermoplastic resins listed previously to exemplify the thermoplastic resins that are intended for use after dissolution in epoxy resins. In particular, polyamide particles are particularly preferred because they are so high in toughness that they serve to produce carbon fiber reinforced composite materials having high impact resistance. Of the various polyamide particle materials, polyamide 12, polyamide 6, polyamide 11, polyamide 66, polyamide 6/12 copolymer, and polyamide polymers modified with an epoxy compound into a semi IPN structure (semi-IPN polyamide) as described in Example 1 of Japanese Unexamined Patent Publication (Kokai) No. HEI 1-104624 can develop particularly high adhesive strength with epoxy resins. Here, IPN stands for interpenetrating polymer network, which is a kind of polymer blend. Crosslinked polymers are used as blend components and the dissimilar crosslinked polymers are partially or fully entangled to form a multiple network structure. A semi-IPN has a multiple network formed of crosslinked and straight-chain polymers. Particles containing a semi-IPN thermoplastic resin as primary component can be produced by, for example, dissolving a thermoplastic resin and a thermosetting resin in a common solvent, mixing them uniformly, and performing reprecipitation etc. The use of particles of an epoxy resin and a semi-IPN polyamideimide serves to produce a prepreg having high heat resistance and high impact resistance.

If particles prepared by further adding an epoxy resin are used as the particles that incorporate a thermoplastic resin as primary component, it is more preferable because the adhesiveness to the epoxy resin composition used as matrix resin increases and serves to produce a carbon fiber reinforced composite material having improved impact resistance. Useful commercial products of such polyamide particles formed by further adding an epoxy resin include SP-500, SP-10, TR-1, and TR-2 (all manufactured by Toray Industries, Inc.); and Orgasol® 1002D, Orgasol® 2001UD, Orgasol® 2001EXD, Orgasol® 2002D, Orgasol® 3202D, Orgasol® 3501D, and Orgasol® 3502D (all manufactured by Arkema).

In regard to the shape of such particles containing thermoplastic resin as primary component, they may be spherical, nonspherical, porous, needle-like, whisker-like, or flaky, of which spherical particles are preferred because spherical particles do not work to reduce the epoxy resin flow property and accordingly can maintain good carbon fiber impregnating property and also because the degree of delamination caused by local impact is further reduced in drop impact (or local impact) test of carbon fiber reinforced composite material so that, in the case where a stress is applied to carbon fiber reinforced composite material after undergoing an impact, there will be a decreased number of delaminated portions resulting from the local impact and acting as starting points of destruction attributed to stress concentration, thereby making it possible to obtain a carbon fiber reinforced composite material having high impact resistance.

Furthermore, some types of particles containing thermoplastic resin as primary component have a higher modification effect because they are not dissolved in the matrix resin during the curing step. The feature of not being dissolved during the curing step is also effective for maintaining fluidity of the resin during the curing step and improving the impregnating property and therefore, particles that are not dissolved in the matrix resin during the curing step are preferred for use as the aforementioned particles containing thermoplastic resin as primary component.

To selectively toughen the resin interlayer in a carbon fiber reinforced composite material produced by curing the prepreg according to the present invention, it is necessary for the particles containing, as primary component, the thermoplastic resin of the component [E] to be maintained in a surface region of the prepreg during the prepreg preparation step and maintained in the resin interlayer while curing lay-up prepregs by heating them under pressure. To realize this, it is preferable for the component [E] to have a volume-average particle diameter in the range of 5 to 50 µm, more preferably in the range of 7 to 40 µm, and still more preferably in the range of 10 to 30 µm. If the volume-average particle diameter is adjusted to 5 µm or more, the component [E] will be prevented from entering into the bundles of carbon fibers of the component [A] when both sides of a primary prepreg is impregnated with the second epoxy resin composition in the prepreg preparation step or when laid-up prepregs are heated under pressure in the molding step, thus making it possible for the component [E] to be maintained in the resin interlayer in the resulting carbon fiber reinforced composite material. On the other hand, if the volume-average particle diameter is adjusted to 50 µm or less, the matrix resin layer at the prepreg surface will have an appropriate thickness, thereby allowing the carbon fibers of the component [A] in the resulting carbon fiber reinforced composite material to have an appropriate volume content.

Here, the volume-average particle diameter is determined by observing the component [E] at a magnification of 1,000 or more under a digital microscope (VHX-5000, manufactured by Keyence Corporation), selecting 100 particles at random, measuring the diameter of the circumscribed circle about each particle to represent its particle size, and making a calculation by the equation (2).

[Mathematical formula 2]

$$Dv = \sum_{i=1}^{n} Di^4 \bigg/ \sum_{i=1}^{n} Di^3 \qquad \text{equation (2)}$$

Here, Di, n, and Dv are the particle diameter of each particle, the number of measurements (100), and the volume-average particle diameter, respectively.

For the present invention, rubber particles may be further incorporated in addition to the components [A] to [E] in order to further enhance the high impact resistance of the carbon fiber reinforced composite material obtained by curing the prepreg according to the present invention.

The rubber particles to be used for the present invention may be of a generally known natural rubber or synthetic rubber. In particular, particles of crosslinked rubber that is insoluble in thermosetting resins are preferred. If it is insoluble in the thermosetting resin used, its cured product will have nearly the same heat resistance as that of the cured product of the thermosetting resin free of the particles. Furthermore, changes in morphology will not occur depending on the difference in the type or curing conditions of the thermosetting resin and therefore, the cured thermosetting resin will have stable physical properties such as toughness. Useful crosslinked rubber particles include, for example, particles of a copolymer with one or a plurality of unsaturated compounds and particles produced through copolymerization between one or a plurality of unsaturated compounds and crosslinkable monomers.

Examples of such unsaturated compounds include aliphatic olefins such as ethylene and propylene; aromatic vinyl compounds such as styrene and methyl styrene; conjugated diene compounds such as butadiene, dimethyl butadiene, isoprene, and chloroprene; unsaturated carboxylates such as methyl acrylate, propyl acrylate, butyl acrylate, methyl methacrylate, propyl methacrylate, and butyl methacrylate; and vinyl cyanides such as acrylonitrile. Furthermore, it may also be effective to use compounds having a carboxyl group, epoxy group, hydroxyl group, amino group, amide group, or other functional groups that are reactive with epoxy resins or curing agents. Useful ones include acrylic acid, glycidyl methacrylate, vinyl phenol, vinyl aniline, and acrylamide.

Useful examples of such crosslinkable monomers include compounds having a plurality of polymerizable double bonds in one molecule, such as divinylbenzene, diallylphthalate, and ethylene glycol dimethacrylate.

These particles can be produced by various generally known conventional polymerization methods including, for example, emulsion polymerization and suspension polymerization. A typical emulsion polymerization process includes a step for emulsion polymerization of an unsaturated compound, crosslinkable monomers, etc., in the presence of a radical polymerization initiator such as peroxide, a molecular weight adjustor such as mercaptan and halogenated hydrocarbon, and an emulsifier, a step for adding a reaction terminator to stop the polymerization reaction after reaching a predetermined degree of polymerization conversion, and a subsequent step for water vapor distillation to remove unreacted monomers out of the polymerization system, thereby providing a latex of a copolymer. Water is removed from such a latex obtained by emulsion polymerization to provide crosslinked rubber particles.

Examples of such crosslinked rubber particles include crosslinked acrylonitrile butadiene rubber particles, crosslinked styrene butadiene rubber particles, acrylic rubber particles, and core shell rubber particles. Core shell type rubber particles are in the form of spherical polymer particles in which the central part and the surface part are of different polymers and may have a simple two phase structure consisting of a core phase and a single shell phase or a multiple layered structure (multiple core shell rubber particles) having a plurality of shell phases and consisting of, for example, a soft core, hard shell, soft shell, and hard shell located in this order from center to surface. Here, a soft phase means a phase of a rubber as described above whereas a hard one means a phase of a resin that is not rubber.

Specific examples of such crosslinked rubber particles include commercial products of crosslinked acrylonitrile butadiene rubber (NBR) particles such as XER-91 (manufactured by JSR Corporation) and DuoMod® DP5045 (manufactured by Zeon Corporation). For crosslinked styrene butadiene rubber (SBR) particles, specific examples include XSK-500 (manufactured by JSR Corporation). Specific examples of acrylic rubber particles include Metabrane® W300A and Metabrane® W450A (both manufactured by Mitsubishi Chemical Corporation), and specific examples of core shell type rubber particles include Stafiloid AC3832 and Stafiloid AC3816N (both manufactured by Ganz Chemical Co., Ltd.), Metabrane® KW-4426 (manufactured by Mitsubishi Chemical Corporation), PARALOID® EXL-2611, PARALOID® EXL-3387, PARALOID® EXL-2655, and PARALOID® EXL-2314 (all manufactured by Rohm and Haas Company), and Stafiloid AC-3355, Stafiloid TR-2105, Stafiloid TR-2102, Stafiloid TR-2122, Stafiloid IM-101, Stafiloid IM-203, Stafiloid IM-301, and Stafiloid IM-401 (all manufactured by Ganz Chemical Co., Ltd.). These different types of crosslinked rubber particles may be used singly or as a combination of two or more thereof.

The epoxy resin composition in the prepreg according to the present invention may contain a coupling agent, thermosetting resin particles, and inorganic fillers such as silica gel, carbon black, clay, carbon nanotube, carbon particles, and metal powder, unless they impair the advantageous effect of the invention. Examples of carbon black include channel black, thermal black, furnace black, and ketjen black.

For the prepreg according to the present invention, to develop the property of forming a slit tape prepreg that suffers only a sufficiently decreased amount of build-up of the epoxy resin composition contained in the slit tape prepreg to the guide rolls during the implementation of an automated lay-up method, it is essential for the second epoxy resin composition contained in the second layer in the prepreg according to the present invention to have a G' at 25° C. of $8.0 \times 10^5$ to $6.0 \times 10^6$ Pa as measured at an angular frequency 3.14 rad/s. It is preferably in the range of $1.2 \times 10^6$ to $5.0 \times 10^6$ Pa, more preferably in the range of $1.6 \times 10^6$ to $4.0 \times 10^6$ Pa. In an automated lay-up method, the upper limit temperature in the steps in which the slit tape prepreg travels on the guide rolls is near room temperature and therefore, if the G' at 25° C. is in the aforementioned range, the second epoxy resin composition will not be deformed easily and its contact area with the guide rolls will not increase easily when the epoxy resin composition comes in contact with the guide rolls during the implementation of the automated lay-up method. Furthermore, the coagulation force of the epoxy resin composition is so large that interface destruction between the epoxy resin composition and guide rolls will occur more easily, rather than cohesive failure of the epoxy resin composition, which serves to prevent the resin from coming out. If the G' is less than $8.0 \times 10^5$ Pa, the second epoxy resin composition will be deformed easily and its contact area with the guide rolls will increase easily when the epoxy resin composition comes in contact with the guide rolls during the implementation of the automated lay-up method. Accordingly, a larger amount of the epoxy resin composition will be deposited, resulting in an increase in required cleaning frequency and a decrease in productivity. In addition, an excessive tackiness will occur due to the low G' to cause a deterioration in rework efficiency for lamination and resin migration, leading to a shortening of the period in which a required tackiness is maintained (occasionally referred to as tack life). If it is larger than $6.0 \times 10^6$ Pa, resin powder will occur on the surface of the slit tape as it is abraded by the guide rolls, and cleaning will become necessary to remove the resin powder that comes out, thereby causing not only a decrease in productivity, but also a deterioration in drapability and a decrease in handleability.

The G' at 25° C. measured at an angular frequency of 3.14 rad/s as referred to herein is determined by taking measurements using a dynamic viscoelasticity measuring apparatus (for example ARES, manufactured by TA Instruments) equipped with parallel plates, which is operated in the auto-strain mode under the conditions of a measurement onset temperature of 10° C., a parallel plate diameter of 8 mm, a parallel plate gap of 1 mm, an angular frequency of 3.14 rad/s, and a temperature ramp rate of 1.7° C./min to give a G' curve, from which the G' value is read at 25° C. It is noted that the G' read at any temperature on the G' curve is referred to as the G' at that temperature.

The G' at a desired temperature measured at an angular frequency of 3.14 rad/s may be determined by measuring the storage elastic modulus E' by the nanoindentation technique, which will be described later, and converting the measurement by the equation (3) given below.

[Mathematical formula 3]

$$G' = 0.0024 \times E' \quad \text{equation (3)}$$

The procedure for measuring the storage elastic modulus E' by the nanoindentation technique is described below. A high accuracy microminiature hardness tester equipped with a diamond triangular pyramid indenter (for example, Triboindenter TI950, manufactured by Hysitron) is used. When a G' value at a particular temperature is needed, the indenter is brought into contact with a resin sample or a prepreg sample at that temperature under a static load that causes an indentation depth of about 1 μm. Then, dynamic measurement is performed for about 3 seconds at a frequency of 120 Hz, followed by removing the load. The measuring system-based stiffness K is calculated from the vibration amplitude of displacement, phase difference, and excited vibration amplitude that are determined in the above measurement, and the storage elastic modulus E' is calculated from the relation of K and the composite elastic modulus values of the indenter and sample.

In addition, the second epoxy resin composition may be sampled by the method described below, followed by performing the above measurement of the G' or performing the measurements relating to the second epoxy resin composition described later. Specifically, a 10 cm×10 cm sample is cut out of a prepreg, and an about 5 mm portion of each of the four sides is masked with a piece of heat resistant tape. The sample was then sandwiched between two sheets, upper and lower, of Lumirror® S10 #188 (manufactured by Toray Industries, Inc.), heated on a hot plate at 70° C. for 30 seconds, immediately pressed by using one back and forth motion of a 2 kg pressing roller, peeling off the Lumirror® sheets from the prepreg, and scraping off the resin transferred to the Lumirror® sheets using a spatula etc. This procedure is repeated until an amount required for measurement is sampled from the second epoxy resin composition.

As a result of intensive studies, the inventors found that since in an automated lay-up method, lamination of a slit tape prepreg is performed generally in the vicinity of 40° C., the deformability of the second epoxy resin composition at the lamination temperature, that is, the G' value of the second epoxy resin composition at 40° C., is of importance when discussing the stickiness of the slit tape prepreg.

To sufficiently reduce the build-up of the epoxy resin composition to the guide rolls and at the same time ensure sufficient adhesiveness between prepreg plies over a wide lamination temperature range, it is essential for the second epoxy resin composition contained in the second layer of the prepreg according to the present invention to give a value of 0.085 or more as calculated by the equation (1). It is preferably 0.090 or more, and more preferably 0.095 or more. In the case where this value is less than 0.085 and at the same time sufficient processability is maintained at room temperature, sufficient adhesiveness may not develop between prepreg plies in the vicinity of 30° C. to 40° C., possibly making it difficult to perform lamination using an automated lay-up device. On the other hand, its upper limit is preferably 0.200 or less. It is more preferably 0.180 or less, and still more preferably 0.160 or less. If this value is more than 0.200, desirable adhesiveness between prepreg plies can be achieved only in a limited lamination temperature range in some cases.

Furthermore, to sufficiently reduce the build-up of the epoxy resin composition to the guide rolls and at the same time further improve the adhesiveness between prepreg plies over a wide lamination temperature range, it is preferable for the second epoxy resin composition according to the present invention to give a value of 0.085 or more as calculated by the equation (4) given below at any temperature in the desirable lamination temperature range of 35° C. to 50° C. It is more preferably 0.090 or more, and still more preferably 0.095.

[Mathematical formula 4]

$$\frac{(\log_{10}(G'(\text{Pa})\text{ at }25°\text{ C.}) - \log_{10}(G'(\text{Pa})\text{ at arbitrary lamination temperature}))}{(\text{arbitrary lamination temperature}(°\text{ C.}) - 25)} \quad \text{equation (4)}$$

In this instance, it is preferable for the second epoxy resin composition at a lamination temperature to have a G' in the range of $4.0 \times 10^3$ to $1.6 \times 10^5$ Pa. It is more preferably in the range of $5.0 \times 10^3$ to $1.2 \times 10^5$ Pa, and still more preferably in the range of $6.0 \times 10^3$ to $9.0 \times 10^4$. If the second epoxy resin composition at a lamination temperature has a G' in the above range, it serves to realize desired adhesiveness between prepreg plies.

For the prepreg according to the present invention, it is preferable for the second epoxy resin composition contained in the second layer to have a glass transition temperature in the range of −10° C. or more and less than 7° C. as measured by differential scanning calorimetry (DSC). It is more preferably in the range of −8° C. or more and less than 6.5° C., and still more preferably in the range of −6° C. or more and less than 6° C. If the glass transition temperature is in this range, it serves to realize the above conditions for G' where the prepreg processability can be improved easily while maintaining a desired drapability.

To determine the glass transition temperature as referred to herein, a DSC curve is obtained by placing a specimen in a nitrogen atmosphere in a DSC apparatus (for example DSC Q-2000, manufactured by TA Instruments), maintaining it at −50° C. for 1 minute, then heating it once over the temperature range up to 350° C. under the conditions of an average temperature ramp rate of 5° C./min, a modulation cycle of 40 seconds, and a modulation amplitude of ±0.5° C., and subsequently, according to JIS-K7121 (1987), straight lines are extended from the low temperature baseline and the high temperature baseline, followed by determining the temperature at the point where the straight line that is equidistant in the vertical axis direction from both of the aforementioned straight lines and the step-like portion of the glass transition curve intersect each other.

Here, to draw a DSC curve, measurements taken by differential scanning calorimetry are plotted on a graph in which the vertical axis represents the difference between the heat energy inputs required by a specimen and a reference in a unit period of time when they are maintained at the same temperature whereas the horizontal axis represents the temperature.

The prepreg according to the present invention is a composite of an epoxy resin composition and carbon fibers. The prepreg according to the present invention is produced by the hot-melt process to ensure the development of the advantageous effect of the invention. The hot-melt process is a solvent-free technique designed for the impregnation of carbon fibers with an epoxy resin composition that is heated to decrease its viscosity. The hot-melt process can be carried out by some different procedures including a procedure in which a matrix resin heated to decrease the viscosity is used for direct impregnation of carbon fibers and a procedure in which release paper sheets laid with resin film are prepared by coating release paper etc. with a matrix resin and then used to cover either or both surfaces of a carbon fiber sheet, followed by applying heat and pressure to ensure the impregnation of the carbon fiber sheet with the matrix resin. The above procedures are generally intended to provide sheet-like prepregs, but a carbon fiber strand may be directly immersed in a resin composition having a decreased viscosity to provide tape-like or thread-like prepregs.

The prepreg according to the present invention has a structure incorporating a first layer composed mainly of the component [A] and a first epoxy resin composition that contains the components [B] to [D] but is substantially free of the component [E] and a second layer composed mainly of a second epoxy resin composition that contains the components [B] to [E] and disposed adjacent to each surface of the first layer, and furthermore, the second epoxy resin composition contained in the second layer has features as described above. Accordingly, properties necessary to realize both processability and laminating performance in an automated lay-up device can be imparted to a prepreg in an industrially advantageous manner without any limitations imposed by the types and contents of the components of the matrix resin.

The "first layer composed mainly of the component [A] and a first epoxy resin composition" mainly consists of the component [A] and a first epoxy resin composition and is characterized in that, when observing a cross section of the prepreg, the component [E] present in the first layer accounts for less than 1% by mass relative to the total quantity of the component [E] present in the prepreg, which accounts for 100% by mass. Specifically, the term "substantially free of the component [E]" means that the component [E] present in the first layer accounts for less than 1% by mass relative to the total quantity of the component [E] present in the prepreg, which accounts for 100% by mass, and therefore, the component [E] may be present in an extremely small amount. The boundary between the first layer and the second layer is determined based on the definition of the interface between the first layer and the second layer described later.

Furthermore, the "second layer containing a second epoxy resin composition" is characterized in that, when observing a cross section of the prepreg, the component [E] present in the second layer accounts for 99% by mass or more relative to the total quantity of the component [E] present in the prepreg, which accounts for 100% by mass.

In addition, the term "a structure incorporating the second layer disposed on each surface of the first layer" referred to herein means a sandwich structure in which the first layer is sandwiched between two (upper and lower) second layers. Here, the interface between the first layer and the second layer may be either distinctly visible or not. In the case where the interface between the first layer and the second layer is not distinctly visible, the quantity of the component [E] in each surface is examined and, of all faces that are parallel to the surface in which it accounts for 99% by mass to 100% by mass relative to the total quantity, i.e. 100% by mass, the one that is adjacent to a second layer and has the smallest content of the component [A] is defined as the interface.

A cross section of a prepreg can be observed by, for example, the method described below. Specifically, a prepreg is interposed between two polytetrafluoroethylene resin plates having smooth surfaces and brought into strong contact with them, and then the temperature is increased gradually so as to reach a curing temperature in seven days to ensure gelation and curing, thus producing a cured prepreg plate. This cured prepreg is observed at a magnification of 200 or more under a digital microscope (VHX-5000, manufactured by Keyence Corporation).

The proportion of the component [E] that exists can be determined by, for example, the method described below. In a cross-sectional photograph obtained from cross-sectional observation of a prepreg, the proportion is calculated from the total area of the component [E] in the entire prepreg and the area of the component [E] in a particular region. Here, total area of the component [E] can be determined from a cross-sectional photograph by a generally known image analysis method or by cutting out the portions of the component [E] and converting their mass. In the case where it is difficult to distinguish the component [E] dispersed in the resin in the photograph, the method of dyeing the component [E] is adoptable.

In addition, for the prepreg according to the present invention, it is preferable that the first epoxy resin composition has a viscosity at 25° C. in the range of $1.0 \times 10^3$ to $1.0 \times 10^5$ Pa·s in order to allow the prepreg to have an appropriate degree of drapability. If the viscosity is less than $1.0 \times 10^3$ Pa·s, the first epoxy resin composition will penetrate easily into the central portion of the prepreg to shorten the tack life whereas if the viscosity is more than $1.0 \times 10^5$ Pa·s, the drapability will be decreased. From such a point of view, it is preferable for the first epoxy resin composition to have a viscosity at 25° C. in the range of $2.0 \times 10^3$ to $2.0 \times 10^4$ Pa·s. Furthermore, from the viewpoint of drapability and tack life, the region that contains the first layer of the prepreg according to the present invention preferably accounts for 30% to 90%, more preferably 40% to 80%, and still more preferably 50% to 70%, of the average thickness of the prepreg.

A good method to incorporate the first epoxy resin composition in the first layer is to prepare in advance a resin film-coated release paper sheet (hereinafter occasionally referred to simply as resin film) containing a piece of release paper etc. coated with a first epoxy resin composition, then apply such a resin film-coated release paper sheet to either or both surfaces of a carbon fiber sheet with the resin film facing the carbon fiber sheet, heat them under pressure to impregnate the carbon fiber with the epoxy resin composition to provide a primary prepreg that serves mainly as base of the first layer, and then impregnate both surfaces of the primary prepreg with the second epoxy resin composition that acts mainly as base of the second layer as in the case of the primary prepreg preparation, thereby providing a prepreg. As another method to produce a prepreg by impregnation with the second epoxy resin composition, a resin film containing a piece of release paper etc. coated with the second epoxy resin composition may be prepared in advance, followed by applying such a resin film-coated release paper sheet to both surfaces of a carbon fiber sheet with the resin film facing the carbon fiber sheet, and heat them under pressure to provide a prepreg. In this instance, the primary prepreg may be wound up once and then unwound while being impregnated with the second epoxy resin composition, or the preparation of a primary prepreg by impregnating a carbon fiber sheet with the first epoxy resin composition may be immediately followed by its impregnation with the second epoxy resin composition. A prepreg having a structure as described above can develop high drapability since the first epoxy resin composition present in the first layer has a sufficiently low viscosity.

From the viewpoint of the processability in the resin film preparation step, it is preferable for the second epoxy resin composition to have a viscosity at 85° C. of 10 to 300 Pa·s. It is more preferably 20 to 200 Pa·s, and still more preferably 30 to 100 Pa·s. If the viscosity at 85° C. is less than 10 Pa·s, it is not preferred because, although it ensures good impregnating property, the resin flows so easily that the resin will flow out from the edge of the release paper sheet when adding a resin film-coated release paper sheet and compressing the layers to form a prepreg, which will result in deterioration in processability for prepregging. If the viscosity at 85° C. is more than 300 Pa·s, it is not preferred because the processability tends to deteriorate, possibly making it impossible to obtain a uniform resin film.

The viscosity at 25° C. or 85° C. as referred to herein is determined by taking measurements using a dynamic viscoelasticity measuring apparatus (for example, ARES, manufactured by TA Instruments) equipped with parallel plates, which is operated in the auto-strain mode under the conditions of a measurement onset temperature of 20° C., a parallel plate diameter of 40 mm, a parallel plate gap of 1 mm, an angular frequency of 3.14 rad/s, and a temperature ramp rate of 1.7° C./min to give a temperature-viscosity curve, from which the viscosity at 25° C. or 85° C. is read.

Alternatively, the prepreg according to the present invention may be produced in a single stage impregnation step, instead of the two stage impregnation step described above. For example, resin films of the second epoxy resin are prepared first, and then the resin films are applied to both sides of a carbon fiber sheet, followed by heating and pressing them to achieve the impregnation of the carbon fiber with the epoxy resin composition, thus providing a prepreg. In this instance, the component [E] has a volume-average particle diameter in the range of 5 to 50 μm and accordingly, the component [E] is prevented from entering into the bundles of carbon fibers of the component [A], thus providing a prepreg having a structure incorporating the first layer composed mainly of the component [A] and the first epoxy resin composition that contains the components [B] to [D] but is substantially free of the component [E] and the second layer composed mainly of the second epoxy resin composition that contains the components [B] to [E] and disposed on each surface of the first layer.

For the prepreg according to the present invention, the carbon fiber sheet preferably has a fiber areal weight of 100 to 1,000 g/m². If the fiber areal weight of the carbon fiber sheet is less than 100 g/m², a larger number of plies have to be stacked to ensure a required thickness when molding a carbon fiber reinforced composite material, possibly leading to troublesome lamination operation. On the other hand, if it is more than 1,000 g/², the prepreg tends to deteriorate in drapability. The fiber mass content is preferably 40 to 90% by mass, and more preferably 50 to 80% by mass. This is preferable because void generation in the moldings is depressed and good mechanical property of carbon fiber is developed. Depending on the molding process, this is preferred also because heat generation from the resin being cured can be controlled while molding large-size parts, thus permitting the production of uniform moldings.

Regarding the structure of the prepreg according to the present invention, it may be either a one directional prepreg or a woven fabric prepreg.

The prepreg according to the present invention can be processed into tapes or threads by dividing it to a required width by a generally known method. Such tape-like or thread-like prepregs can be applied suitably to an automated lay-up device. For example, slit tape prepregs that are produced by slitting the prepreg according to the present invention in the fiber direction by a slitting technique as described later tend to have accurately controlled width and can be applied suitably to an automated lay-up method.

Such slit tape prepregs preferably have a width of 3 to 150 mm, but preferably have a width of 3 to 13 mm when used to produce parts having complicated shapes by the AFP method. Furthermore, narrow slit tape prepregs having a width of 3 to 7 mm are more preferred. Cutting of a prepreg can be achieved by using a generally known cutter. Examples include carbide blade cutter, ultrasonic cutter, and round blade cutter.

The carbon fiber reinforced composite material according to the present invention can be produced by laying up plies of the prepreg or slit tape prepreg according to the present invention in an appropriate shape and heating them to cure the resin. It is preferable to press them during the molding step from the viewpoint of depressing the formation of voids and obtaining uniformly cured products. Here, the application of heat and pressure can be carried out by using a generally known method such as autoclave molding method, press forming method, bag molding method, wrapping tape method, and internal pressure molding.

Carbon fiber reinforced composite materials produced by the above molding methods preferably have glass transition temperatures in the range of 100° C. to 250° C. from the viewpoint of processability of the molded materials in post-treatment steps. In the case of aircraft parts, in particular, the glass transition temperature is preferably in the range of 170° C. to 250° C. in order to permit their application to parts for use at high temperatures.

EXAMPLES

The present invention will now be illustrated in detail with reference to Examples, but it should be understood that the invention is not construed as being limited thereto. Preparation and evaluation of prepreg samples in Examples were performed in an atmosphere at a temperature of 23° C.±2° C. and relative humidity of 50% unless otherwise specified.

Component [A] <Carbon Fiber>
Torayca® T800S-24000 (carbon fiber having 24,000 filaments, tensile strength of 5.9 GPa, tensile modulus of 294 GPa, and tensile elongation of 2.0%, manufactured by Toray Industries, Inc.)

Component [B] <Epoxy Resin>
SUMI-EPDXY® ELM434 (tetraglycidyl diaminodiphenyl methane, manufactured by Sumitomo Chemical Co., Ltd., epoxy equivalent weight 120 g/eq)
jER® 827 (bisphenol A type epoxy resin, manufactured by Mitsubishi Chemical Corporation, epoxy equivalent weight 185 g/eq)
jER® 807 (bisphenol F type epoxy resin, manufactured by Mitsubishi Chemical Corporation, epoxy equivalent weight 170 g/eq)

Component [C] <Curing Agent>
SEIKACURE S (4,4'-diaminodiphenyl sulfone, manufactured by Seika K.K., active hydrogen equivalent weight 62 g/eq)

Component [D] <Thermoplastic Resin>
Sumika Excel® PES5003P (polyethersulfone, manufactured by Sumitomo Chemical Co., Ltd., weight-average molecular weight 47,000 g/mol, Tg=225° C.)
Virantage® VW-10700RFP (polyethersulfone, manufactured by Solvay, weight-average molecular weight 21,000 g/mol, Tg=220° C.)

Virantage® VW-10300FP (polyethersulfone, manufactured by Solvay, weight-average molecular weight 55,000 g/mol, Tg=220° C.)

Component [E] <Particles Containing Thermoplastic Resin as Primary Component>

Polyamide particles containing TROGAMID® CX7323 and VESTAMID® EX9200 prepared by the method described below (hereinafter referred to simply as polyamide particles) In a 10 L stainless steel autoclave, 4.2 parts by mass of TROGAM ID® (manufactured by Daicel-Evonik), 1.8 parts by mass of Vestamid® EX9200 (manufactured by Daicel-Evonik), 10 parts by mass of GOHSENOL® GM-14 (manufactured by Nippon Synthetic Chemical Industry Co., Ltd.), and 84 parts by mass of N-methyl-2-pyrrolidone were fed, and nitrogen substitution was performed to 99 vol % or more, followed by heating up to 180° C. and stirring for 5 hours to dissolve the materials. In this step, the calculated oxygen concentration was 1% or less. Subsequently, 60 parts by mass of ion exchanged water was supplied through a liquid supply pump and dropped at a rate of 0.5 part by mass/min. After completing the addition of water, the temperature was lowered while continuing stirring, and the resulting suspension liquid was filtrated, followed by reslurry washing with 400 parts by mass of ion-exchanged water, filtration, and suction drying at 80° C. for 10 hours to produce white powder with a yield of 95%. The resulting powder was observed by scanning electron microscopy and found to be perfectly spherical fine particles with a volume-average particle diameter of 15 μm.

(1) Preparation of Epoxy Resin Composition

Epoxy resins of the component [B] and thermoplastic resins of the component [D] in the amounts and proportions as given in Tables 1 to 2 were fed in a kneader and heated up to 150° C. while kneading, followed by stirring for 1 hour so that the component [D] was dissolved to form a transparent viscous liquid. This liquid was allowed to cool to 100° C. while kneading and then a curing agent of the component [C] was added, followed by additional kneading to provide a first epoxy resin composition.

Elsewhere, the component [E] was added and kneaded before adding the component [C], and subsequently the component [C] was added and kneaded to provide a second epoxy resin composition containing the component [E].

(2) Measurement of Storage Elastic Modulus G' and Viscosity of Second Epoxy Resin Composition The G' of the second epoxy resin composition is determined by taking measurements at increasing temperatures using a dynamic viscoelasticity measuring apparatus (ARES, manufactured by TA Instruments) equipped with parallel plates with a diameter of 8 mm, which was operated in the auto-strain mode under the conditions of a parallel plate gap of 1 mm, an angular frequency of 3.14 rad/s, a measurement onset temperature of 10° C., and a temperature ramp rate of 1.7° C./min. In addition, the viscosity was measured by the same procedure as for G' except for mounting parallel plates with a diameter of 40 mm and adopting a measurement onset temperature of 20° C. Of the resulting measurements, the value of G' read at 25° C. and the value of viscosity read at 85° C. are shown in Tables 3 and 4 as representative values.

(3) Measurements of Glass Transition Temperature of Second Epoxy Resin Composition After sampling an about 3 mg specimen of the second epoxy resin composition, a DSC curve was obtained by placing the specimen in a nitrogen atmosphere in a differential scanning calorimeter (DSC) (DSC Q-2000, manufactured by TA Instruments), maintaining it at −50° C. for 1 minute, then heating it once over the temperature range up to 350° C. under the conditions of an average temperature ramp rate of 5° C./min, a modulation cycle of 40 seconds, and a modulation amplitude of ±0.5° C., and according to JIS-K7121 (1987), straight lines were extended from the low temperature baseline and the high temperature baseline, followed by determining the temperature at the point where the straight line that was equidistant in the vertical axis direction from both of the aforementioned straight lines and the step-like portion of the glass transition curve intersected each other to represent the glass transition temperature.

To draw a DSC curve as referred to herein, measurements taken by differential scanning calorimetry are plotted on a graph in which the vertical axis represents the difference between the heat energy inputs required by a specimen and a reference in a unit period of time when they are maintained at the same temperature whereas the horizontal axis represents the temperature.

(4) Preparation of Prepregs

For the following Examples, prepregs were prepared as described below. Silicone was spread over a piece of release paper and the first or second epoxy resin composition prepared in paragraph (1) was spread uniformly on top of it to prepare a first resin film and a second resin film. A layer of carbon fibers arranged uniformly in one direction (T800SC-24000, manufactured by Toray Industries, Inc.) was sandwiched between two sheets of the first resin film and heated under pressure using a press roll to provide a primary prepreg containing a carbon fiber layer impregnated with the first epoxy resin composition designed to serve mainly as base for the first layer (carbon fiber mass 190 g/cm$^2$, resin content 24% by mass). After the impregnation with the first epoxy resin composition, both release paper sheets were removed from the primary prepreg. Subsequently, the primary prepreg was sandwiched between two sheets of the second resin film designed to serve mainly as base for the second layer and heated under pressure using a press roll to provide a prepreg containing the primary prepreg impregnated with the second epoxy resin composition (carbon fiber mass 190 g/cm$^2$, resin content 35%). The prepreg resulting here had only one surface covered with release paper.

(5) Measurement of Built Up Resin/Fuzz on Path Line (Prepreg Processability Evaluation)

A prepreg sample was passed at a constant speed through a path narrower than the width of the prepreg so that both edges of the prepreg were abraded, while the amount of resin/fuzz coming off from the prepreg was measured to simulate the build-up of resin to an automated lay-up device, thereby evaluating the processability of the prepreg by the automated lay-up method.

This evaluation employed a bobbin stand to supply a prepreg, guide rolls to allow the prepreg to travel at predetermined positions, stainless steel blocks to form a path narrower than the width of the prepreg, and a wind-up machine to take up the prepreg.

Pairs of stainless steel blocks with a gap of 6.1 mm between the paired blocks were placed at six positions located at intervals of 100 mm, and a prepreg prepared as described in the above paragraph (4) and slit to a width of 6.35 mm was caused to travel over a distance of 1,500 m at a speed of 20 m/min, and the weight of extraneous matter getting built up to the block surfaces during the traveling of the prepreg was measured using an electronic balance.

The prepreg processability of the automated lay-up method was rated as A to D according to a four stage criterion based on the measured weight of extraneous matter. A sample is rated as A if the weight of extraneous matter is 300 mg or less, rated as B if it is more than 300 mg and 330 mg or less, rated as C if it is more than 330 mg and 360 mg or less, and rated as D if it is more than 360 mg, wherein A represents the highest-level processability whereas D represents insufficient, unacceptable-level processability.

(6) Measurement of Built Up Resin/Fuzz on Cutter Blade (Prepreg Processability Evaluation)

A prepreg was cut continuously and the amount of the built up resin/fuzz on the cutter blade was measured to simulate the build-up of the resin to the automated lay-up device, thereby evaluating the prepreg processability of the automated lay-up method.

A prepreg prepared as described in the above paragraph (4) and slit to a width of 6.35 mm was cut 500 times continuously using the same position of a shear-cut type slitter made of an alloy (SKD11), which consisted mainly of a movable blade moving back and forth and a fixed blade. The weights of the movable blade and fixed blade were measured on an electronic balance before and after the cutting operation and the weight of the resin/fuzz built up to the cutter blades was calculated from the difference in the weights of the blades between before and after the cutting operation.

The prepreg processability of the automated lay-up method was rated as A to D according to a four stage criterion based on the calculated weight of resin/fuzz. A sample was rated as A if the weight of resin/fuzz was 1 mg or less, rated as B if it is more than 1 mg and 2 mg or less, rated as C if it is more than 2 mg and 3 mg or less, and rated as D if it is more than 3 mg, wherein A represents the highest-level processability whereas D represents insufficient, unacceptable-level processability.

(7) Preparation of Sample for Measurement of Prepreg Peel Strength

A prepreg prepared as described in the above paragraph (4), with one surface covered with release paper, was cut in such a manner that the fiber direction coincided with the length direction of the prepreg sample to a size of 50 mm×200 mm or 50 mm×150 mm.

A prepreg sample of 50 mm×150 mm was fixed to a stainless steel plate of 50 mm×150 mm×1.5 mm thickness using double-sided tape. This fixation was done in such a manner that the prepreg surface not covered with release paper was in contact with the double sided tape. Then, the release paper was removed while leaving its 10 mm end portion measured in the length direction of the prepreg sample to prepare a lower side measurement sample.

Then, a prepreg sample of 50 mm×200 mm, held with the release paper covered side up, was put on the lower side measurement sample while aligning it with the release paper-free end of the lower side measurement sample in such a manner that it was parallel with the length direction.

In addition, the two prepreg samples were left to stand for 5 minutes in a chamber at a humidity of 25% RH and a temperature 35° C. and, while keeping them in the chamber, pasted together under a load of 100 N applied by using a stainless steel press roll having a diameter of 30 mm and a width of 75 mm moved at a speed of 500 mm/min to prepare a measurement sample.

Measurement samples were prepared by the same procedure except for changing the temperature to 40° C., 45° C., or 50° C.

(8) Measurement of Prepreg Peel Strength (Evaluation of Laminating Performance of Prepregs)

Prepreg peel strength was measured by 90° peeling test according to JIS Z0237 (2009) "Test method for pressure sensitive adhesive tapes and pressure sensitive adhesive sheets". For each measurement sample prepared in the above paragraph (7), an end portion of a prepreg squeezed out of the stainless steel plate was fixed to a digital force gauge (ZTA-500N, manufactured by Imada Co., Ltd.) and the sample was left to stand for 5 minutes in a chamber (SH-642, manufactured by Espec Corp.) at a humidity of 25% RH and the same temperature as used for the measurement sample preparation in the above paragraph (7). After the standing period, while in the chamber, the digital force gauge was pulled up in an angle of 90° to the stainless steel plate at a speed of 500 mm/min using a linear slider (manufactured by Oriental Motor Co., Ltd.) to separate the prepreg piles from each other. The measurements taken from the first 25 mm long portion after the start of separation was omitted and the measurements taken from the next 30 mm long portion were averaged, followed by dividing the average by 50 mm to calculate the peel strength (unit: N/mm) over the temperature range.

The laminating performance of prepregs was rated as A to D according to a four stage criterion based on the average peel strength determined at 35° C., 40° C., 45° C., and 50° C. (hereinafter referred to simply as average peel strength over 35° C. to 50° C. range). A sample was rated as A if its average peel strength over 35° C. to 50° C. range was 0.23 N/mm or more, rated as B if it was 0.19 N/mm or more and less than 0.23 N/mm, rated as C if it was 0.15 N/mm or more and less than 0.19 N/mm, and rated as D if it was less than 0.15 N/mm, wherein A represents the highest-level tackiness suitable for lamination by an automated lay-up device whereas D represents an insufficient, unacceptable-level tackiness for lamination by an automated lay-up device.

(9) Evaluation of Drapability of Prepregs (Evaluation of Laminating Performance of Prepregs)

A sample having a width of 12.7 mm and a length of 400 mm was cut out of a prepreg and one end thereof was fixed on a horizontal table in such a manner that a 200 mm end portion of the prepreg sample protruded from the edge of the table. After leaving it to stand for 10 minutes, the deflection angle of the prepreg sample was measured to represent its drapability. In this instance, the angle between the straight line formed by extending the prepreg sample fixed on the table in the horizontal direction and the straight line formed by connecting the free end of the prepreg sample to the root of the protruded portion of the prepreg sample was defined as the deflection angle of the prepreg.

The drapability of a prepreg was rated as A to D according to a four stage criterion based on the measured deflection angle. A sample was rated as A if it was 20° or more, rated as B if it was 15° or more and less than 20°, rated as C if it was 10° or more and less than 15°, and rated as D if it was less than 10°, wherein A represents the highest-level drapability whereas D represents an insufficient, unacceptable drapability.

(10) Overall Evaluation

According to the evaluation results in the above paragraphs (5), (6), (8), and (9), marks of 3, 2, 1, or −1 points were given to samples rated as A, B, C, and D, respectively, and as an overall evaluation for processability and laminating performance of prepregs, a prepreg was rated as A if it obtained a total mark of 11 points or more in the four evaluation items, rated as B if it obtained 9 points or more and less than 11 points, rated as C if it obtained 7 points or more and less than 9 points, and rated as D if it obtained less than 7 points, wherein A represents high processability and laminating performance realized simultaneously whereas D represents insufficient, unacceptable processability and laminating performance.

TABLE 1

|  |  | Example 1 | Example 2 | Example 3 | Example 4 | Example 5 | Example 6 |
|---|---|---|---|---|---|---|---|
| 1: first epoxy resin composition |  | 1 | 2 | 1 | 2 | 1 | 2 | 1 | 2 | 1 | 2 | 1 | 2 |
| 2: second epoxy resin composition |  | | | | | | | | | | | | |
| Component [B] | Tetraglycidyldiaminodiphenylmethane (SUMI-EPOXY® ELM434) | 60 | 60 | 60 | 60 | 60 | 60 | 60 | 60 | 70 | 70 | 50 | 50 |
|  | bisphenol A type epoxy resin (jER® 827) | 25 | 25 | 25 | 25 | 25 | 25 | 25 | 25 | 30 | 30 | 25 | 25 |
|  | bisphenol F type epoxy (jER® 807) | 15 | 15 | 15 | 15 | 15 | 15 | 15 | 15 |  |  | 25 | 25 |
| Component [C] | 4,4'-diaminodiphenyl sulfone (SEIKACURE S) | 47 | 47 | 47 | 47 | 47 | 47 | 47 | 47 | 47 | 47 | 47 | 47 |
| Component [D] | polyethersulfone (Virantage® VW-10700RFP) |  | 18 |  | 20 |  | 22 |  | 24 |  | 16 |  | 24 |
|  | polyethersulfone (Sumika Excel® PES5003P) | 6 |  | 6 |  | 6 |  | 6 |  | 6 |  | 6 |  |
|  | polyethersulfone (Virantage® VW-10300FP) |  |  |  |  |  |  |  |  |  |  |  |  |
| Component [E] | polyamide particles |  | 71 |  | 72 |  | 72 |  | 73 |  | 70 |  | 73 |
| Thermoplastic resin [D] (parts by mass) in 100 parts by mass of second epoxy resin composition |  | 7.7 | 8.4 | 9.1 | 9.8 | 6.9 | 9.8 |
| Thermoplastic resin [D] (parts by mass) in total of first and second epoxy resin compositions (100 parts by mass) in prepreg |  | 5.4 | 5.7 | 6.0 | 6.3 | 5.1 | 6.3 |

TABLE 2

|  |  | Comparative example 1 | Comparative example 2 | Comparative example 3 | Comparative example 4 |
|---|---|---|---|---|---|
| 1: first epoxy resin composition |  | 1 | 2 | 1 | 2 | 1 | 2 | 1 | 2 |
| 2: second epoxy resin composition |  | | | | | | | | |
| Component [B] | tetraglycidyldiaminodiphenylmethane (SUMI-EPOXY® ELM434) | 60 | 60 | 60 | 60 | 60 | 60 | 60 | 60 |
|  | bisphenol A type epoxy resin (jER® 827) | 25 | 25 | 25 | 25 | 25 | 25 | 25 | 25 |
|  | bisphenol F type epoxy (jER® 807) | 15 | 15 | 15 | 15 | 15 | 15 | 15 | 15 |
| Component [C] | 4,4'-diaminodiphenyl sulfone (SEIKACURE S) | 47 | 47 | 47 | 47 | 47 | 47 | 47 | 47 |
| Component [D] | polyethersulfone (Virantage® VW-10700RFP) |  | 13 |  | 16 |  | 28 |  |  |
|  | polyethersulfone (Sumika Excel® PES5003P) | 6 |  | 6 |  | 6 |  | 6 | 16 |
|  | polyethersulfone (Virantage® VW-10300FP) |  |  |  |  |  |  |  |  |
| Component [E] | polyamide particles |  | 68 |  | 70 |  | 75 |  | 70 |
| Thermoplastic resin [D] (parts by mass) in 100 parts by mass of second epoxy resin composition |  | 5.6 | 7.0 | 11.2 | 7.0 |
| Thermoplastic resin [D] (parts by mass) in total of first and second epoxy resin compositions (100 parts by mass) in prepreg |  | 4.6 | 5.2 | 6.8 | 5.2 |

|  |  | Comparative example 5 | Comparative example 6 | Comparative example 7 | Comparative example 8 |
|---|---|---|---|---|---|
| 1: first epoxy resin composition |  | 1 | 2 | 1 | 2 | 1 | 2 | 1 | 2 |
| 2: second epoxy resin composition |  | | | | | | | | |
| Component [B] | tetraglycidyldiaminodiphenylmethane (SUMI-EPOXY® ELM434) | 60 | 60 | 60 | 60 | 60 | 60 | 60 | 60 |
|  | bisphenol A type epoxy resin (jER® 827) | 25 | 25 | 25 | 25 | 25 | 25 | 25 | 25 |
|  | bisphenol F type epoxy (jER® 807) | 15 | 15 | 15 | 15 | 15 | 15 | 15 | 15 |
| Component [C] | 4,4'-diaminodiphenyl sulfone (SEIKACURE S) | 47 | 47 | 47 | 47 | 47 | 47 | 47 | 47 |
| Component [D] | polyethersulfone (Virantage® VW-10700RFP) |  |  |  |  |  |  |  |  |
|  | polyethersulfone (Sumika Excel® PES5003P) | 6 | 18 | 6 | 20 | 6 |  | 6 |  |
|  | polyethersulfone (Virantage® VW-10300FP) |  |  |  |  |  | 16 |  | 18 |
| Component [E] | polyamide particles |  | 71 |  | 72 |  | 70 |  | 71 |
| Thermoplastic resin [D] (parts by mass) in 100 parts by mass of second epoxy resin composition |  | 7.7 | 8.4 | 7.0 | 7.6 |
| Thermoplastic resin [D] (parts by mass) in total of first and second epoxy resin compositions (100 parts by mass) in prepreg |  | 5.4 | 5.7 | 5.2 | 5.4 |

TABLE 3

|  |  | | Example 1 | Example 2 | Example 3 | Example 4 | Example 5 | Example 6 |
|---|---|---|---|---|---|---|---|---|
| Properties of second epoxy resin composition | storage elastic modulus G' at 25° C. (Pa) | | $8.2 \times 10^5$ | $1.2 \times 10^6$ | $1.6 \times 10^6$ | $2.2 \times 10^6$ | $1.4 \times 10^6$ | $1.6 \times 10^6$ |
| | value of equation (4) | 35° C. | 0.102 | 0.099 | 0.099 | 0.098 | 0.110 | 0.102 |
| | | 40° C. | 0.101 | 0.097 | 0.098 | 0.097 | 0.113 | 0.100 |
| | | 45° C. | 0.107 | 0.103 | 0.100 | 0.102 | 0.119 | 0.102 |
| | | 50° C. | 0.108 | 0.105 | 0.102 | 0.104 | 0.111 | 0.104 |
| | glass transition temperature (° C.) | | 3.6 | 4.7 | 5.7 | 6.9 | 3.0 | 4.5 |
| | viscosity at 85° C. (Pa·s) | | 85 | 101 | 117 | 184 | 42 | 60 |

TABLE 3-continued

| | | | Example 1 | Example 2 | Example 3 | Example 4 | Example 5 | Example 6 |
|---|---|---|---|---|---|---|---|---|
| Properties of prepreg | amount of built up resin/fuzz (mg) | path line | 353 | 316 | 286 | 257 | 303 | 290 |
| | | rating | C | B | A | A | B | A |
| | | cutter blade | 2.3 | 1.3 | 0.8 | 0.5 | 1.1 | 0.9 |
| | | rating | C | B | A | A | B | A |
| | peel strength (N/mm) | 35° C. | 0.24 | 0.18 | 0.14 | 0.10 | 0.20 | 0.15 |
| | | 40° C. | 0.35 | 0.32 | 0.29 | 0.24 | 0.34 | 0.30 |
| | | 45° C. | 0.23 | 0.30 | 0.34 | 0.35 | 0.22 | 0.33 |
| | | 50° C. | 0.07 | 0.13 | 0.19 | 0.24 | 0.10 | 0.17 |
| | | average over 35° C.-50° C. range | 0.22 | 0.23 | 0.24 | 0.23 | 0.22 | 0.24 |
| | | rating | B | A | A | A | B | A |
| | drapability | deflection angle (°) | 22 | 18 | 15 | 12 | 24 | 18 |
| | | rating | A | B | B | C | A | B |
| Overall evaluation | | | C | B | A | B | B | A |

TABLE 4

| | | | Comparative example 1 | Comparative example 2 | Comparative example 3 | Comparative example 4 |
|---|---|---|---|---|---|---|
| Properties of second epoxy resin composition | storage elastic modulus G' at 25° C. (Pa) | | $2.9 \times 10^5$ | $5.4 \times 10^5$ | $3.9 \times 10^6$ | $3.9 \times 10^5$ |
| | value of equation (4) | 35° C. | 0.129 | 0.112 | 0.102 | 0.080 |
| | | 40° C. | 0.133 | 0.115 | 0.097 | 0.077 |
| | | 45° C. | 0.130 | 0.121 | 0.098 | 0.079 |
| | | 50° C. | 0.119 | 0.113 | 0.098 | 0.078 |
| | glass transition temperature (° C.) | | 0.2 | 2.4 | 8.6 | 2.7 |
| | viscosity at 85° C. (Pa·s) | | 42 | 73 | 283 | 180 |
| Properties of prepreg | amount of built up resin/fuzz (mg) | path line | 420 | 386 | 310 | 406 |
| | | rating | D | D | B | D |
| | | cutter blade | 11.4 | 4.3 | 0.2 | 7.2 |
| | | rating | D | D | A | D |
| | peel strength (N/mm) | 35° C. | 0.33 | 0.32 | 0.06 | 0.27 |
| | | 40° C. | 0.13 | 0.30 | 0.16 | 0.34 |
| | | 45° C. | 0.02 | 0.09 | 0.31 | 0.30 |
| | | 50° C. | 0.01 | 0.03 | 0.33 | 0.18 |
| | | average over 35° C.-50° C. range | 0.12 | 0.18 | 0.22 | 0.27 |
| | | rating | D | C | B | A |
| | drapability | deflection angle (°) | 41 | 27 | 8 | 26 |
| | | rating | A | A | D | A |
| Overall evaluation | | | D | D | D | D |

| | | | Comparative example 5 | Comparative example 6 | Comparative example 7 | Comparative example 8 |
|---|---|---|---|---|---|---|
| Properties of second epoxy resin composition | storage elastic modulus G' at 25° C. (Pa) | | $8.1 \times 10^5$ | $1.5 \times 10^6$ | $3.8 \times 10^5$ | $8.5 \times 10^5$ |
| | value of equation (4) | 35° C. | 0.079 | 0.081 | 0.069 | 0.068 |
| | | 40° C. | 0.076 | 0.075 | 0.070 | 0.069 |
| | | 45° C. | 0.076 | 0.073 | 0.072 | 0.071 |
| | | 50° C. | 0.077 | 0.074 | 0.069 | 0.068 |
| | glass transition temperature (° C.) | | 4.0 | 5.1 | 3.2 | 4.2 |
| | viscosity at 85° C. (Pa·s) | | 290 | 511 | 295 | 630 |
| Properties of prepreg | amount of built up resin/fuzz (mg) | path line | 365 | film formation impossible | 407 | film formation impossible |
| | | rating | D | | D | |
| | | cutter blade | 2.4 | | 7.5 | |
| | | rating | C | | D | |
| | peel strength (N/mm) | 35° C. | 0.17 | | 0.25 | |
| | | 40° C. | 0.28 | | 0.33 | |
| | | 45° C. | 0.35 | | 0.33 | |
| | | 50° C. | 0.30 | | 0.25 | |
| | | average over 35° C.-50° C. range | 0.27 | | 0.29 | |
| | | rating | A | | A | |
| | drapability | deflection angle (°) | 20 | | 19 | |
| | | rating | A | | B | |
| Overall evaluation | | | D | D | D | D |

Example 1

According to the procedure described in the above paragraph (1), a first epoxy resin composition was prepared by mixing 60 parts of SUMI-EPDXY® ELM434, 25 parts of jER® 807, and 15 parts of jER® 807 as the component [B], 47 parts of SEIKACURE-S as the component [C], and 6 parts of Sumika Excel® PES5003P as the component [D]. Then, according to the procedure described in the above paragraph (1), a second epoxy resin composition was prepared by mixing 60 parts of SUMI-EPDXY® ELM434, 25 parts of jER® 827, and 15 parts of jER® 807 as the component [B], 47 parts of SEIKACURE-S as the component [C], 18 parts of Virantage® VW-10700RFP as the component [D], and 71 parts of polyamide particles prepared by the above method as the component [E].

In addition, using Torayca® T800SC-24000 as the component [A] and also using the first and second epoxy resin compositions prepared above, a prepreg was produced by the procedure described in the above paragraph (4).

As shown in Table 3, the second epoxy resin composition prepared above had a storage elastic modulus G' at 25° C. of $8.2 \times 10^5$ Pa as measured at an angular frequency of 3.14 rad/s and was acceptable in terms of the amount of resin/fuzz built up to the path line and cutter blades. The average peel strength over the 35° C. to 50° C. range calculated by the procedure described in the above paragraph (8) was 0.22 N/mm, indicating a tack suitable for lamination by an automated lay-up device. In addition, the second epoxy resin composition had a glass transition temperature of 3.6° C. as measured by the procedure described in the above paragraph (3), and it was found to be particularly good in terms of drapability when evaluated as specified in the above paragraph (9).

The prepreg was rated as C in the overall evaluation for processability and laminating performance as evaluated by the procedure described in the above paragraph (10) and it was found to be acceptable in terms of simultaneous realization of processability and laminating performance in an automated lay-up device.

Example 2

Except for using 20 parts, instead of 18 parts, of Virantage® VW-10700RFP for the component [D] and 72 parts, instead of 71 parts, of polyamide particles for the component [E] when preparing the second epoxy resin composition, the same procedure as in Example 1 was carried out to produce a prepreg.

As shown in Table 3, the second epoxy resin composition prepared above had a storage elastic modulus G' at 25° C. of $1.2 \times 10^6$ Pa as measured at an angular frequency of 3.14 rad/s and decreased in the amount of resin/fuzz built up to the path line and cutter blades as compared with Example 1. The average peel strength over the 35° C. to 50° C. range calculated by the procedure described in the above paragraph (8) was 0.23 N/mm, indicating a tack particularly suitable for lamination by an automated lay-up device. In addition, the second epoxy resin composition had a glass transition temperature of 4.7° C. as measured by the procedure described in the above paragraph (3), and it was found to be good in terms of drapability when evaluated as specified in the above paragraph (9).

The prepreg was rated as B in the overall evaluation for processability and laminating performance as evaluated by the procedure described in the above paragraph (10) and it was found to be good in terms of simultaneous realization of processability and laminating performance in an automated lay-up device.

Example 3

Except for using 22 parts, instead of 18 parts, of Virantage® VW-10700RFP for the component [D] and 72 parts, instead of 71 parts, of polyamide particles for the component [E] when preparing the second epoxy resin composition, the same procedure as in Example 1 was carried out to produce a prepreg.

As shown in Table 3, the second epoxy resin composition prepared above had a storage elastic modulus G' at 25° C. of $1.6 \times 10^6$ Pa as measured at an angular frequency of 3.14 rad/s and decreased in the amount of resin/fuzz built up to the path line and cutter blades as compared with Examples 1 and 2. The average peel strength over the 35° C. to 50° C. range calculated by the procedure described in the above paragraph (8) was 0.24 N/mm, indicating a tack particularly suitable for lamination by an automated lay-up device. In addition, the second epoxy resin composition had a glass transition temperature of 5.7° C. as measured by the procedure described in the above paragraph (3), and it was found to be good in terms of drapability when evaluated as specified in the above paragraph (9).

The prepreg was rated as A in the overall evaluation for processability and laminating performance as evaluated by the procedure described in the above paragraph (10) and it was found to be particularly good in terms of simultaneous realization of processability and laminating performance in an automated lay-up device.

Example 4

Except for using 24 parts, instead of 18 parts, of Virantage® VW-10700RFP for the component [D] and 73 parts, instead of 71 parts, of polyamide particles for the component [E] when preparing the second epoxy resin composition, the same procedure as in Example 1 was carried out to produce a prepreg.

As shown in Table 3, the second epoxy resin composition prepared above had a storage elastic modulus G' at 25° C. of $2.2 \times 10^6$ Pa as measured at an angular frequency of 3.14 rad/s and decreased in the amount of resin/fuzz built up to the path line and cutter blades as compared with Example 3. The average peel strength over the 35° C. to 50° C. range calculated by the procedure described in the above paragraph (8) was 0.23 N/mm, indicating a tack particularly suitable for lamination by an automated lay-up device. In addition, the second epoxy resin composition had a glass transition temperature of 6.9° C. as measured by the procedure described in the above paragraph (3), and it was found to be acceptable in terms of drapability when evaluated as specified in the above paragraph (9).

The prepreg was rated as B in the overall evaluation for processability and laminating performance as evaluated by the procedure described in the above paragraph (10) and it was found to be good in terms of simultaneous realization of processability and laminating performance in an automated lay-up device.

Example 5

According to the procedure described in the above paragraph (1), a first epoxy resin composition was prepared by mixing 70 parts of SUMI-EPDXY® ELM434 and 30 parts of jER® 827 as the component [B], 47 parts of SEIKACURE-S as the component [C], and 6 parts of Sumika Excel® PES5003P as the component [D]. Next, according to the procedure described in the above paragraph (1), a second epoxy resin composition was prepared by mixing 70 parts of SUMI-EPDXY® ELM434 and 30 parts of jER® 827 as the component [B], 47 parts of SEIKACURE-S as the component [C], 16 parts of Virantage® VW-10700RFP as the component [D], and 70 parts of polyamide particles prepared by the above method as the component [E].

In addition, using Torayca® T800SC-24000 as the component [A] and also using the first and second epoxy resin compositions prepared above, a prepreg was produced by the procedure described in the above paragraph (4).

As shown in Table 3, the second epoxy resin composition prepared above had a storage elastic modulus G' at 25° C. of $1.4 \times 10^6$ Pa as measured at an angular frequency of 3.14 rad/s and decreased in the amount of resin/fuzz built up to the path line and cutter blades as compared with Example 1. The average peel strength over the 35° C. to 50° C. range calculated by the procedure described in the above paragraph (8) was 0.22 N/mm, indicating a tack suitable for lamination by an automated lay-up device. In addition, the second epoxy resin composition had a glass transition temperature of 3.0° C. as measured by the procedure described in the above paragraph (3), and it was found to be particularly good in terms of drapability when evaluated as specified in the above paragraph (9).

The prepreg was rated as B in the overall evaluation for processability and laminating performance as evaluated by the procedure described in the above paragraph (10) and it was found to be good in terms of simultaneous realization of processability and laminating performance in an automated lay-up device.

Example 6

Except for using 50 parts, instead of 60 parts, of SUMI-EPDXY® ELM434 for the component [B] and 25 parts, instead of 15 parts, of jER® 807 when preparing the first epoxy resin composition and second epoxy resin composition, the same procedure as in Example 4 was carried out to produce a prepreg.

As shown in Table 3, the second epoxy resin composition prepared above had a storage elastic modulus G' at 25° C. of $1.6 \times 10^6$ Pa as measured at an angular frequency of 3.14 rad/s and was comparable in the amount of resin/fuzz built up to the path line and cutter blades as compared with Example 3. The average peel strength over the 35° C. to 50° C. range calculated by the procedure described in the above paragraph (8) was 0.24 N/mm, indicating a tack particularly suitable for lamination by an automated lay-up device. In addition, the second epoxy resin composition had a glass transition temperature of 4.5° C. as measured by the procedure described in the above paragraph (3), and it was found to be good in terms of drapability when evaluated as specified in the above paragraph (9).

The prepreg was rated as A in the overall evaluation for processability and laminating performance as evaluated by the procedure described in the above paragraph (10) and it was found to be particularly good in terms of simultaneous realization of processability and laminating performance in an automated lay-up device.

Comparative Example 1

Except for using 13 parts, instead of 18 parts, of Virantage VW-10700RFP for the component [D] and 68 parts, instead of 71 parts, of polyamide particles for the component [E] when preparing the second epoxy resin composition, the same procedure as in Example 1 was carried out to produce a prepreg.

As shown in Table 4, the second epoxy resin composition prepared above had a storage elastic modulus G' at 25° C. of $2.9 \times 10^5$ Pa as measured at an angular frequency of 3.14 rad/s and increased in the amount of resin/fuzz built up to the path line and cutter blades as compared with Example 1. The average peel strength over the 35° C. to 50° C. range calculated by the procedure described in the above paragraph (8) was 0.12 N/mm, indicating a tack insufficient for lamination by an automated lay-up device. In addition, the second epoxy resin composition had a glass transition temperature of 0.2° C. as measured by the procedure described in the above paragraph (3), and it was found to be particularly good in terms of drapability when evaluated as specified in the above paragraph (9).

The prepreg was rated as D in the overall evaluation for processability and laminating performance as evaluated by the procedure described in the above paragraph (10) and it was found to be poor and unacceptable in terms of simultaneous realization of processability and laminating performance in an automated lay-up device.

Comparative Example 2

Except for using 16 parts, instead of 18 parts, of Virantage® VW-10700RFP for the component [D] and 70 parts, instead of 71 parts, of polyamide particles for the component [E] when preparing the second epoxy resin composition, the same procedure as in Example 1 was carried out to produce a prepreg.

As shown in Table 4, the second epoxy resin composition prepared above had a storage elastic modulus G' at 25° C. of $5.4 \times 10^5$ Pa as measured at an angular frequency of 3.14 rad/s and increased in the amount of resin/fuzz built up to the path line and cutter blades as compared with Example 1. The average peel strength over the 35° C. to 50° C. range calculated by the procedure described in the above paragraph (8) was 0.18 N/mm, indicating a tack acceptable for lamination by an automated lay-up device. In addition, the second epoxy resin composition had a glass transition temperature of 2.4° C. as measured by the procedure described in the above paragraph (3), and it was found to be particularly good in terms of drapability when evaluated as specified in the above paragraph (9).

The prepreg was rated as D in the overall evaluation for processability and laminating performance as evaluated by the procedure described in the above paragraph (10) and it was found to be poor and unacceptable in terms of simultaneous realization of processability and laminating performance in an automated lay-up device.

Comparative Example 3

Except for using 28 parts, instead of 18 parts, of Virantage® VW-10700RFP for the component [D] and 75 parts, instead of 71 parts, of polyamide particles for the component [E] when preparing the second epoxy resin composition, the same procedure as in Example 1 was carried out to produce a prepreg.

As shown in Table 4, the second epoxy resin composition prepared above had a storage elastic modulus G' at 25° C. of $3.9 \times 10^6$ Pa as measured at an angular frequency of 3.14 rad/s and decreased in the amount of resin/fuzz built up to the path line and cutter blades as compared with Example 1. The average peel strength over the 35° C. to 50° C. range calculated by the procedure described in the above paragraph (8) was 0.22 N/mm, indicating a tack suitable for lamination by an automated lay-up device. In addition, the second epoxy resin composition had a glass transition temperature of 8.6° C. as calculated by the procedure described in the above paragraph (3), and it was found to be poor and unacceptable in terms of drapability when evaluated as specified in the above paragraph (9).

The prepreg was rated as D in the overall evaluation for processability and laminating performance as evaluated by the procedure described in the above paragraph (10) and it was found to be poor and unacceptable in terms of simultaneous realization of processability and laminating performance in an automated lay-up device.

Comparative Example 4

Except for using Sumika Excel® PES5003P, instead of Virantage® VW-10700RFP, for the component [D] when preparing the second epoxy resin composition, the same procedure as in Comparative example 2 was carried out to produce a prepreg.

As shown in Table 4, the second epoxy resin composition prepared above had a storage elastic modulus G' at 25° C. of $3.9 \times 10^5$ Pa as measured at an angular frequency of 3.14 rad/s and increased in the amount of resin/fuzz built up to the path line and cutter blades as compared with Example 1. The average peel strength over the 35° C. to 50° C. range calculated by the procedure described in the above paragraph (8) was 0.27 N/mm, indicating a tack particularly suitable for lamination by an automated lay-up device. In addition, the second epoxy resin composition had a glass transition temperature of 2.7° C. as measured by the procedure described in the above paragraph (3), and it was found to be particularly good in terms of drapability when evaluated as specified in the above paragraph (9).

The prepreg was rated as D in the overall evaluation for processability and laminating performance as evaluated by the procedure described in the above paragraph (10) and it was found to be poor and unacceptable in terms of simultaneous realization of processability and laminating performance in an automated lay-up device.

Comparative Example 5

Except for using Sumika Excel® PES5003P, instead of Virantage® VW-10700RFP, for the component [D] when preparing the second epoxy resin composition, the same procedure as in Example 1 was carried out to produce a prepreg.

As shown in Table 4, the second epoxy resin composition prepared above had a storage elastic modulus G' at 25° C. of $8.1 \times 10^5$ Pa as measured at an angular frequency of 3.14 rad/s and slightly increased in the amount of resin/fuzz built up to the path line and cutter blades as compared with Example 1. The average peel strength over the 35° C. to 50° C. range calculated by the procedure described in the above paragraph (8) was 0.27 N/mm, indicating a tack particularly suitable for lamination by an automated lay-up device. In addition, the second epoxy resin composition had a glass transition temperature of 4.0° C. as measured by the procedure described in the above paragraph (3), and it was found to be particularly good in terms of drapability when evaluated as specified in the above paragraph (9).

The prepreg was rated as D in the overall evaluation for processability and laminating performance as evaluated by the procedure described in the above paragraph (10) and it was found to be poor and unacceptable in terms of simultaneous realization of processability and laminating performance in an automated lay-up device.

Comparative Example 6

Except for using Sumika Excel® PES5003P, instead of Virantage® VW-10700RFP, for the component [D], the same procedure as in Example 2 was carried out to prepare a second epoxy resin composition. However, the second epoxy resin composition prepared above was so high in viscosity that it was not able to be spread uniformly over a release paper sheet. As a result, it was impossible to prepare a second resin film and to produce a prepreg.

Comparative Example 7

Except for using Virantage® VW-10300FP, instead of Virantage® VW-10700RFP, for the component [D] when preparing the second epoxy resin composition, the same procedure as in Comparative example 2 was carried out to produce a prepreg.

As shown in Table 4, the second epoxy resin composition prepared above had a storage elastic modulus G' at 25° C. of $3.8 \times 10^5$ Pa as measured at an angular frequency of 3.14 rad/s and increased in the amount of resin/fuzz built up to the path line and cutter blades as compared with Example 1. The average peel strength over the 35° C. to 50° C. range calculated by the procedure described in the above paragraph (8) was 0.29 N/mm, indicating a tack particularly suitable for lamination by an automated lay-up device. In addition, the second epoxy resin composition had a glass transition temperature of 3.2° C. as measured by the procedure described in the above paragraph (3), and it was found to be good in terms of drapability when evaluated as specified in the above paragraph (9).

The prepreg was rated as D in the overall evaluation for processability and laminating performance as evaluated by the procedure described in the above paragraph (10) and it was found to be poor and unacceptable in terms of simultaneous realization of processability and laminating performance in an automated lay-up device.

Comparative Example 8

Except for using Virantage® VW-10300FP, instead of Virantage® VW-10700RFP, for the component [D], the same procedure as in Example 1 was carried out to prepare a second epoxy resin composition. However, the second epoxy resin composition prepared above was so high in viscosity that it was not able to be spread uniformly over a release paper sheet. As a result, it was impossible to prepare a second resin film and to produce a prepreg.

A comparison between the results obtained in Examples 1 to 6 and those in Comparative examples 1 and 2 suggests that, even in the case where the value specified by the above equation (1) is 0.085 or more, the amount of resin/fuzz built up to the path line and cutter blades is so large and the processability is so low that it is impossible to obtain a prepreg that shows both processability and laminating performance in an automated lay-up device, if the storage elastic modulus G' at 25° C. is less than $8.0 \times 10^5$ Pa as measured at an angular frequency 3.14 rad/s.

A comparison between the results obtained in Examples 1 to 6 and those in Comparative example 3 suggests that, even in the case where the storage elastic modulus G' at 25° C. is $8.0 \times 10^5$ to $6.0 \times 10^6$ Pa as measured at an angular frequency 3.14 rad/s and at the same time the value specified by the above equation (1) is 0.085 or more, the drapability is so low that it is impossible to obtain a prepreg that shows both processability and laminating performance in an automated lay-up device, if the glass transition temperature is 7° C. or more.

A comparison between the results obtained in Examples 1 to 6 and those in Comparative examples 4 to 8 suggests that, in the case where the component [D] contained in the second epoxy resin composition has a weight-average molecular weight of more than 30,000 g/mol, it is impossible to simultaneously achieve both a storage elastic modulus G' at 25° C. of $8.0 \times 10^5$ to $6.0 \times 10^6$ Pa as measured at an angular frequency 3.14 rad/s and a value of 0.085 or more as specified by the above equation (1) and therefore, it is impossible to obtain a prepreg that shows both processability and laminating performance in an automated lay-up device.

INDUSTRIAL APPLICABILITY

The present invention can provide a prepreg that shows high processability and laminating performance in an automated lay-up device and also provide a carbon fiber reinforced composite material. Preferred applications in the aerospace industry include, for example, primary structural parts of aircraft such as main wing and fuselage; secondary structural parts such as tail unit, floor beam, flap, aileron, cowl, fairing, and interior materials; and others such as rocket motor case and structural parts of artificial satellites. Preferred applications for general industrial uses include structural parts of vehicles such as automobile, ship, and railroad vehicle; and civil engineering and construction materials such as drive shaft, plate spring, windmill blade, various turbines, pressure vessel, flywheel, roller for paper manufacture, roofing material, cable, reinforcing bar, and mending/reinforcing materials. Preferred applications in the sporting goods industry include golf shafts, fishing poles, rackets for tennis, badminton, squash, etc., sticks for hockey etc., and skiing poles.

The invention claimed is:

1. A prepreg comprising components [A] to [E]:
[A] carbon fiber,
[B] epoxy resin,
[C] curing agent,
[D] thermoplastic resin, and
[E] particles containing a thermoplastic resin as primary component and having a volume-average particle diameter of 5 to 50 μm,
the prepreg having a structure incorporating a first layer composed mainly of the component [A] and a first epoxy resin composition containing the components [B] to [D] but substantially free of the component [E] and a second layer composed mainly of a second epoxy resin composition containing the components [B] to [E] and disposed adjacent to each surface of the first layer,
wherein the component [D] of the second epoxy resin composition has a weight-average molecular weight of 2,000 to 30,000 g/mol and accounts for 8 to 15 parts by mass relative to the total quantity of the components [B] to [E] of the second epoxy resin composition, which accounts for 100 parts by mass,
wherein the second epoxy resin composition has a storage elastic modulus G' at 25° C. of $8.0 \times 10^5$ to $6.0 \times 10^6$ Pa as measured at an angular frequency of 3.14 rad/s, giving a value of 0.085 or more as calculated by the equation (1) below, and showing a glass transition temperature of −10° C. or more and less than 7° C. as measured by differential scanning calorimetry (DSC), wherein the component [D] of the first epoxy resin composition and the second epoxy resin composition accounts for 4 parts by mass or more and less than 8 parts by mass relative to the total quantity of the first epoxy resin composition and the second epoxy resin composition, which accounts for 100 parts by mass.

2. The prepreg as set forth in claim 1, wherein the second epoxy resin composition has a viscosity at 85° C. of 10 to 300 Pa·s.

3. The prepreg as set forth in claim 1, wherein the component [D] is a polysulfone or a polyethersulfone.

4. A slit tape prepreg produced by slitting the prepreg as set forth in claim 1.

5. A carbon fiber reinforced composite material produced by laying up plies of the prepreg set forth in claim 1 or plies of the slit tape prepreg set forth in claim 4, followed by curing them.

6. The prepreg as set forth in claim 1, wherein the component [D] in the first epoxy resin composition and the component [D] in the second epoxy resin composition have different weight-average molecular weights.

7. The prepreg as set forth in claim 6, wherein the component [D] of the first epoxy resin composition has a weight-average molecular weight of 47,000 to 60,000 g/mol.

8. The prepreg as set forth in claim 1,
wherein the component [E] contains a polyamide selected from the group consisting of polyamide 12, polyamide 6, polyamide 11, polyamide 66, a polyamide 6/12 copolymer and polyamide polymers modified with an epoxy compound into a semi IPN structure and,
wherein the component [E] accounts for 30 parts by mass or more relative to the total quantity of the components [B] to [E] of the second epoxy resin composition, which accounts for 100 parts by mass.

9. A prepreg production method comprising:
a step for preparing a primary prepreg by impregnating component [A] with a first epoxy resin composition comprising components [B] to [D] but substantially free of the component [E]
[A] carbon fiber,
[B] epoxy resin,
[C] curing agent,
[D] thermoplastic resin, and
[E] particles containing a thermoplastic resin as primary component and having a volume-average particle diameter of 5 to 50 μm, and
a subsequent step for impregnating each surface thereof with a second epoxy resin composition containing at least the components [B] to [E],
wherein the component [D] of the second epoxy resin composition has a weight-average molecular weight of 2,000 to 30,000 g/mol and accounts for 8 to 15 parts by mass relative to the total quantity of the components [B] to [E] of the second epoxy resin composition, which accounts for 100 parts by mass,
wherein the second epoxy resin composition has a storage elastic modulus G' at 25° C. of $8.0 \times 10^5$ to $6.0 \times 10^6$ Pa as measured at an angular frequency of 3.14 rad/s, giving a value of 0.085 or more as calculated by the equation (1) below, and showing a glass transition temperature of −10° C. or more and less than 7° C. as measured by differential scanning calorimetry (DSC), $$\frac{\log_{10}(G'(\text{Pa}) \text{ at } 25°\text{ C.}) - \log_{10}(G'(\text{Pa}) \text{ at } 40°\text{ C.})}{15} \quad \text{equation (1)}$$

and wherein the component [D] of the first epoxy resin composition and the second epoxy resin composition accounts for 4 parts by mass or more and less than 8 parts by mass relative to the total quantity of the first epoxy resin composition and the second epoxy resin composition, which accounts for 100 parts by mass.

\* \* \* \* \*